(12) United States Patent
Yasuda

(10) Patent No.: US 9,909,519 B2
(45) Date of Patent: Mar. 6, 2018

(54) INTERNAL COMBUSTION ENGINE SYSTEM

(71) Applicant: TOYOTA JIDOSHA KABUSHIKI KAISHA, Toyota-shi, Aichi-ken (JP)

(72) Inventor: Hiromichi Yasuda, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 297 days.

(21) Appl. No.: 14/750,317

(22) Filed: Jun. 25, 2015

(65) Prior Publication Data
US 2015/0377166 A1    Dec. 31, 2015

(30) Foreign Application Priority Data

Jun. 27, 2014 (JP) .................. 2014-132934
Apr. 14, 2015 (JP) .................. 2015-082467

(51) Int. Cl.
*F02D 41/22* (2006.01)
*F02B 77/08* (2006.01)
(Continued)

(52) U.S. Cl.
CPC ............ *F02D 41/22* (2013.01); *F02B 77/085* (2013.01); *F02B 77/088* (2013.01);
(Continued)

(58) Field of Classification Search
CPC .... F02D 41/22; F02D 35/023; F02D 41/0002; F02D 41/3005; F02D 41/009; F02D 35/028; F02D 2041/228; F02D 2200/101; F02P 5/151; F02P 3/05; F02P 5/045; F02P 5/153; G01M 15/08; Y02T 10/46; F02B 77/085; F02B 77/088
(Continued)

(56) References Cited

U.S. PATENT DOCUMENTS 4,491,010 A * 1/1985 Brandt .................. G01L 23/222
                                                        73/35.05
4,704,996 A * 11/1987 Morikawa ............... F02B 31/06
                                                        123/184.53
(Continued)

FOREIGN PATENT DOCUMENTS

EP    2860380 A1    4/2015
JP    61-169620 A   7/1986
(Continued)

*Primary Examiner* — Stephen K Cronin
*Assistant Examiner* — Susan Scharpf
(74) *Attorney, Agent, or Firm* — Andrews Kurth Kenyon LLP

(57) ABSTRACT

An internal combustion engine system includes: an in-cylinder pressure sensor; a crank angle sensor; and a seal portion that seals a space between an outer face of a housing and a wall surface of a cylinder head. A slope that is a ratio of the amount of decrease in a heat release amount relative to the amount of increase in a crank angle is calculated in a period during an expansion stroke from a combustion end point until an opening timing of an exhaust valve. The existence or nonexistence of an abnormality in the sealing function of the seal portion is determined based on whether or not a ratio of the amount of decrease in the slope to the amount of increase in an engine speed is greater than a threshold value.

5 Claims, 16 Drawing Sheets

(51) Int. Cl.
  *F02D 35/02* (2006.01)
  *G01M 15/08* (2006.01)
  *F02D 41/30* (2006.01)
  *F02P 5/15* (2006.01)
  *F02D 41/00* (2006.01)
  *F02P 5/153* (2006.01)
  *F02P 5/04* (2006.01)
  *F02P 3/05* (2006.01)

(52) U.S. Cl.
  CPC ....... *F02D 35/023* (2013.01); *F02D 41/0002* (2013.01); *F02D 41/3005* (2013.01); *F02P 5/151* (2013.01); *G01M 15/08* (2013.01); *F02D 35/028* (2013.01); *F02D 41/009* (2013.01); *F02D 2041/228* (2013.01); *F02D 2200/101* (2013.01); *F02P 3/05* (2013.01); *F02P 5/045* (2013.01); *F02P 5/153* (2013.01); *Y02T 10/46* (2013.01)

(58) Field of Classification Search
  USPC ..................................... 123/406.41; 701/108
  See application file for complete search history.

(56) References Cited

U.S. PATENT DOCUMENTS

| | | | | |
|---|---|---|---|---|
| 4,724,702 A * | 2/1988 | Hamren | ................ | G01M 15/08 330/282 |
| 4,821,194 A * | 4/1989 | Kawamura | .............. | F02P 11/06 123/406.16 |
| 5,126,617 A * | 6/1992 | Lukasiewicz | ........... | G01L 23/10 310/338 |
| 5,138,885 A * | 8/1992 | Okauchi | ................. | G01L 19/14 73/708 |
| 5,537,883 A * | 7/1996 | Okauchi | ................. | G01L 23/10 29/25.35 |
| 5,765,532 A * | 6/1998 | Loye | ..................... | F02D 35/023 123/435 |
| 5,878,717 A * | 3/1999 | Zur Loye | .............. | F02D 35/023 123/435 |
| 5,900,541 A * | 5/1999 | Morris | .................. | G01L 5/0004 73/114.16 |
| 6,684,151 B1 * | 1/2004 | Ring | ..................... | F02D 35/023 123/435 |
| 6,776,032 B2 * | 8/2004 | Matsui | .................. | F02D 35/023 73/114.06 |
| 7,542,865 B2 * | 6/2009 | Hoshi | ................... | F02D 35/023 123/406.48 |
| 7,610,139 B2 * | 10/2009 | Mizuno | ................ | G01L 23/221 701/102 |
| 8,260,531 B2 * | 9/2012 | Yasuda | ................ | F02D 35/023 123/435 |
| 8,396,649 B2 * | 3/2013 | Huang | .................. | F02D 35/024 123/406.27 |
| 2005/0034525 A1 | 2/2005 | Moelkner et al. | | |
| 2006/0032472 A1 * | 2/2006 | Yamada | ................ | G01L 23/22 123/145 A |
| 2015/0219026 A1 | 8/2015 | Urano | | |

FOREIGN PATENT DOCUMENTS

| | | |
|---|---|---|
| JP | 62-95442 A | 5/1987 |
| JP | H06-265430 A | 9/1994 |
| JP | 2005-043364 A | 2/2005 |
| JP | 2006-009630 A | 1/2006 |
| JP | 2008-64058 A | 3/2008 |
| JP | 2009-122076 A | 6/2009 |
| JP | 2011-220128 A | 11/2011 |
| JP | 2012-149561 A | 8/2012 |
| JP | 2012-149562 A | 8/2012 |
| JP | 2012-225252 A | 11/2012 |
| JP | 2014-20206 A | 2/2014 |
| JP | 2014-80918 A | 5/2014 |
| WO | 02095191 A2 | 11/2002 |
| WO | 2013183163 A1 | 12/2013 |

* cited by examiner

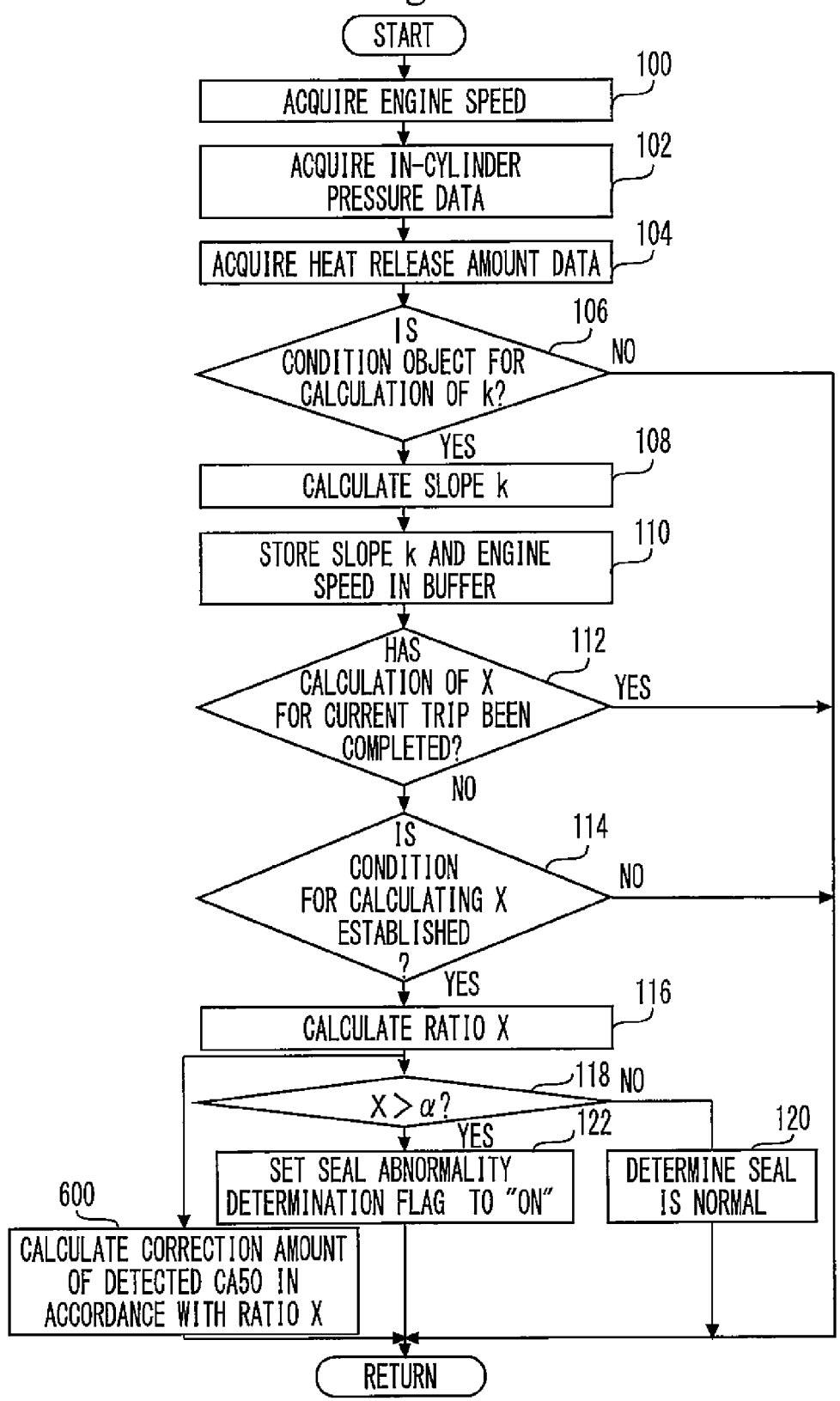

INTERNAL COMBUSTION ENGINE SYSTEM

CROSS-REFERENCE TO RELATED APPLICATIONS

The present application claims priority to Japanese Patent Application Nos. 2014-132934 filed on Jun. 27, 2014 and 2015-082467 filed on Apr. 14, 2015, which are incorporated herein by reference in their entireties.

BACKGROUND OF THE INVENTION

Field of the Invention

The present invention relates to an internal combustion engine system.

Background Art

An internal combustion engine including an in-cylinder pressure sensor is already known, as disclosed, for example, in Japanese Patent Laid-Open No. 2009-122076. In the aforementioned conventional internal combustion engine, a seal portion is provided that seals a space between an outer face of the in-cylinder pressure sensor having a cylindrical outer shape and a wall surface of a combustion chamber that surrounds the in-cylinder pressure sensor. With the aforementioned seal portion, sealing is performed by intimate contact between a tapered portion having a tapered shape that is formed on the outer face of the in-cylinder pressure sensor and a tapered portion of the wall surface of the combustion chamber that opposes the tapered portion.

A diaphragm (pressure receiving member) that receives an in-cylinder pressure is provided at one end of a cylindrical housing which the aforementioned in-cylinder pressure sensor includes. A detecting element (strain gauge element) is disposed inside the housing. A compressive load that is based on the in-cylinder pressure is input to the detecting element from the diaphragm through a pressure transmitting member, and the detecting element outputs an output in accordance with the input compressive load. The seal portion is provided at a position that is on the side of the aforementioned one end of the housing relative to the detecting element in the axial direction of the housing.

The following problem exists in a configuration such as that described in the aforementioned Japanese Patent Laid-Open No. 2009-122076 in which a seal portion is provided at a position that is further on a combustion chamber side relative to a detecting element in the axial direction of a housing. That is, with respect to a gap between the housing and the wall surface of the combustion chamber, if the sealing function of the seal portion is normal, high temperature combustion gas enters only as far as a gap that is on the tip side relative to the position at which the seal portion is provided. In contrast, if an abnormality arises in the seal portion and the sealing function declines, high temperature combustion gas will flow in as far as a gap that is further to the inner side than the seal portion. Consequently, the amount of heat received from the combustion gas by a member located along a path on which the compressive load is transmitted from the pressure receiving member to the detecting element increases. As a result, there is an increase in a detection error in the in-cylinder pressure that is attributable to thermal strain of a tip portion of the sensor that is involved in the detection of pressure from the pressure receiving member to the detecting element that is caused by a transient difference between the thermal expansion of a member (housing) on the outer side of the tip portion of the sensor and the thermal expansion of a member on the inner side thereof. Therefore, it is desirable to provide means for enabling a determination as to whether or not there is an abnormality in the sealing function of the seal portion on an actual machine.

SUMMARY OF THE INVENTION

The present invention has been conceived to address the above described problem, and an object of the present invention is to provide an internal combustion engine system configured to enable a determination as to the existence or nonexistence of an abnormality in a sealing function of a seal portion between an in-cylinder pressure sensor and a wall surface of a combustion chamber.

An internal combustion engine system according to the present invention includes an in-cylinder pressure sensor, a crank angle sensor, a seal portion and a controller. The in-cylinder pressure sensor includes: a housing that is formed into a cylindrical shape; a pressure receiving member that is provided at one end of the housing and configured to receive an in-cylinder pressure, the in-cylinder pressure being a pressure of a gas inside a combustion chamber; and a pressure detecting element that is arranged inside the housing and into which a compressive load that is based on the in-cylinder pressure configured to be input from the pressure receiving member, the pressure detecting element being configured to emit an output in accordance with the input compressive load. The crank angle sensor is configured to detect a crank angle. The seal portion is configured to seal a space between an outer face of the housing and a wall surface of the combustion chamber that surrounds the housing, at a position that is further on the combustion chamber side than the pressure detecting element in an axial direction of the housing. The controller is programmed to: calculate a heat release amount in a cylinder that is an amount of heat released by combustion, based on in-cylinder pressure data that is data regarding an in-cylinder pressure that is detected by the in-cylinder pressure sensor; calculate a first ratio that is a ratio of an amount of decrease in a heat release amount relative to an amount of increase in a crank angle in a period during an expansion stroke from a crank angle at which a calculated heat release amount exhibits a maximum value until an opening timing of an exhaust valve; and determine existence or nonexistence of an abnormality in a sealing function of the seal portion based on the first ratio and an engine speed.

Preferably, in a case where a second ratio that is a ratio of an amount of decrease in the first ratio relative to an amount of increase in an engine speed is greater than a first threshold value, the controller determines that the sealing function of the seal portion is abnormal.

Preferably, in a case where the first ratio is greater than a second threshold value that corresponds to an engine speed in a cycle in which in-cylinder pressure data that serves as a basis for calculation of the first ratio is acquired, the controller determines that the sealing function of the seal portion is abnormal. Preferably, the second threshold value is set so as to become smaller when the engine speed is high in comparison to when the engine speed is low.

The controller may calculate a mass fraction burned and may calculate an ignition delay period using a spark timing and a calculated mass fraction burned. The controller may correct a calculated ignition delay period in accordance with a size of the second ratio.

In addition, preferably the controller adjusts at least one of a fuel injection amount, an intake air amount and an ignition energy so that a difference between a calculated ignition delay period and a target value of the ignition delay period is eliminated.

The controller may calculate a mass fraction burned and may calculate a combustion center based on a calculated mass fraction burned. The controller may correct a calculated combustion center in accordance with a size of the second ratio.

In addition, preferably the controller may adjust a spark timing so that a difference between a calculated combustion center and a target combustion center is eliminated.

The controller may calculate a mass fraction burned and may calculate an ignition delay period using a spark timing and a calculated mass fraction burned. The controller may correct a calculated ignition delay period in accordance with a size of the first ratio.

In addition, preferably the controller adjust at least one of a fuel injection amount, an intake air amount and an ignition energy so that a difference between a calculated ignition delay period and a target value of the ignition delay period is eliminated.

The controller may calculate a mass fraction burned and may calculate a combustion center based on a calculated mass fraction burned. The controller may correct a calculated combustion center in accordance with a size of the first ratio.

In addition, preferably the controller adjusts a spark timing so that a difference between a calculated combustion center and a target combustion center is eliminated.

Preferably the controller makes a determination with respect to an abnormality in the sealing function of the seal portion at a time that an internal combustion engine is operating under a stoichiometric air-fuel ratio.

According to the present invention, a first ratio that is a ratio of an amount of decrease in a heat release amount relative to an amount of increase in a crank angle is calculated in a period during an expansion stroke from a crank angle at which a heat release amount exhibits a maximum value until an opening timing of an exhaust valve. A first ratio that is calculated in this manner increases upon receiving the influence of a detection error of an in-cylinder pressure sensor that is caused by thermal strain. In a case where a seal portion is provided at the same position as that of the in-cylinder pressure sensor in the present invention, the first ratio will increase if an abnormality arises in the sealing function of the seal portion. The engine speed is the dominant parameter with respect to the first ratio. Accordingly, the existence or nonexistence of an abnormality in the sealing function of the seal portion can be determined based on the first ratio and the engine speed.

BRIEF DESCRIPTION OF THE DRAWINGS

FIG. 22 is a flowchart illustrating a routine that is executed in the fourth embodiment of the present invention.

DETAILED DESCRIPTION OF THE PREFERRED EMBODIMENTS

First Embodiment

[System Configuration of First Embodiment]

Figure 1:
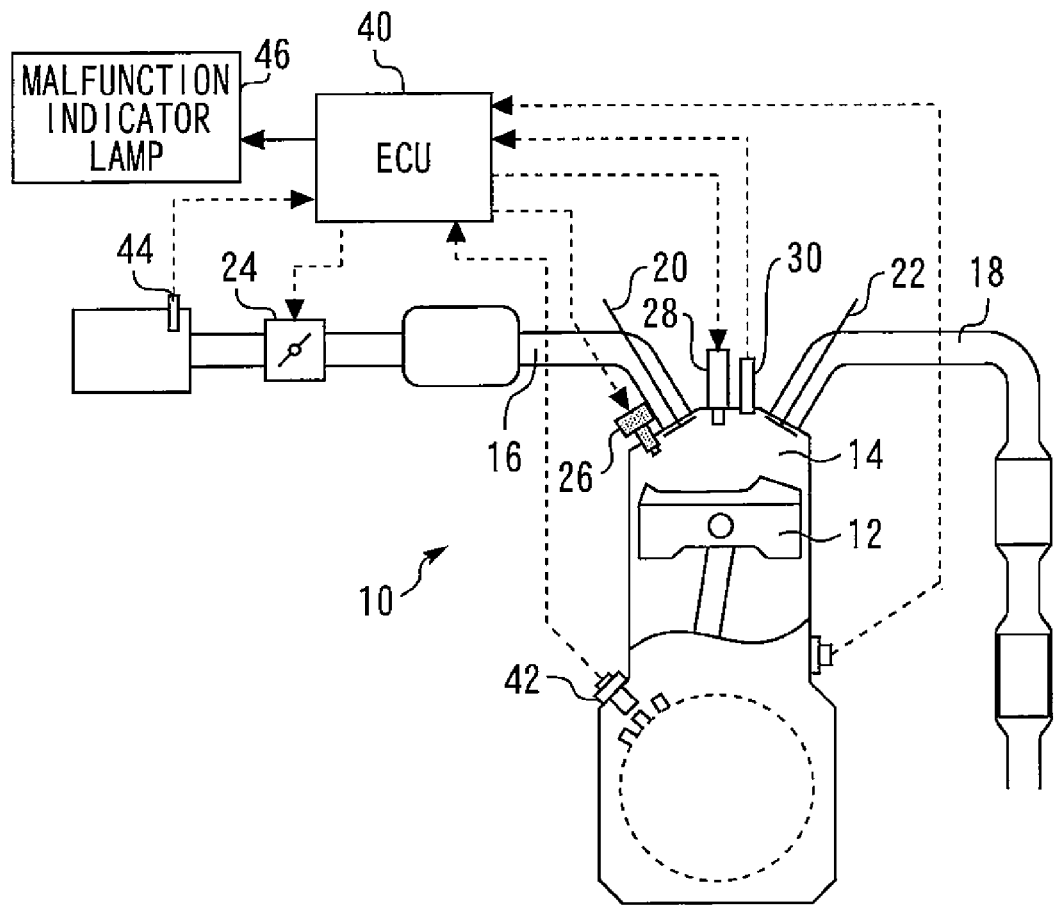
FIG. 1 is a view for describing the system configuration of an internal combustion engine according to a first embodiment of the present invention.

FIG. 1 is a view for describing the system configuration of an internal combustion engine 10 in a first embodiment of the present invention. An internal combustion engine system shown in FIG. 1 includes the spark ignition internal combustion engine 10. A piston 12 is provided in each cylinder of the internal combustion engine 10. A combustion chamber 14 is formed at the top side of the piston 12 inside the relevant cylinder. An intake passage 16 and an exhaust passage 18 communicate with the combustion chamber 14.

An intake valve 20 that opens and closes an intake port of the intake passage 16 is provided inside the intake port. An exhaust valve 22 that opens and closes an exhaust port of the exhaust passage 18 is provided inside the exhaust port. An electronically controlled throttle valve 24 is also provided in the intake passage 16.

Each cylinder of the internal combustion engine 10 is provided with a fuel injection valve 26 for injecting fuel directly into the combustion chamber 14 (into the cylinder), and a spark plug 28 for igniting an air-fuel mixture. An in-cylinder pressure sensor 30 for detecting an in-cylinder pressure that is the pressure of gas inside the combustion chamber 14 is also mounted in each cylinder.

The system of the present embodiment also includes an electronic control unit (ECU) 40. The ECU 40 includes a central processing unit (CPU), a memory circuit including a ROM and a RAM or the like, and input/output ports and the like. In addition to the aforementioned in-cylinder pressure sensor 30, various sensors for acquiring the operating state of the internal combustion engine 10 such as a crank angle sensor 42 and an air flow meter 44 are connected to an input port of the ECU 40. The crank angle sensor 42 detects a crank angle. The ECU 40 can acquire the engine speed by utilizing signals of detected crank angles. The air flow meter 44 measures an intake air amount. Various actuators for controlling the operation of the internal combustion engine 10 such as the throttle valve 24, the fuel injection valve 26 and the spark plug 28 are connected to an output port of the ECU 40. A malfunction indicator lamp (MIL) 46 for notifying the driver of an abnormality in a sealing function of a seal portion 34 that is described later is also connected to an output port of the ECU 40. The ECU 40 performs predetermined engine control such as fuel injection control and ignition control by driving the above described various actuators based on the outputs of the above described various sensors and predetermined programs. The ECU 40 also has a function of synchronizing an output signal of the in-cylinder pressure sensor 30 with a crank angle, and subjecting the synchronized signal to AD conversion and acquiring the resulting signal. It is thereby possible to detect an in-cylinder pressure at an arbitrary crank angle timing in a range allowed by the AD conversion resolution. In addition, the ECU 40 has a function of calculating, in accordance with the crank angle, a value of an in-cylinder volume that depends on the crank angle position.

According to the system of the present embodiment that includes the in-cylinder pressure sensor 30 and the crank angle sensor 42, in-cylinder pressure data (an in-cylinder pressure waveform) can be acquired in synchrony with the crank angle (CA) in each cycle of the internal combustion engine 10 (see FIG. 4(B) that is described later). A heat release amount Q in the cylinder at an arbitrary crank angle θ can be calculated in accordance with the following equations (1) and (2) using the obtained in-cylinder pressure data and the first law of thermodynamics. Furthermore, a mass fraction burned (hereunder, referred to as "MFB") at an arbitrary crank angle θ can be calculated in accordance with the following equation (3) using the calculated data of the heat release amount Q in the cylinder. Further, a crank angle at a time that the MFB becomes a predetermined ratio X (%) can be acquired utilizing equation (3).

$$dQ/d\theta = \frac{1}{\kappa - 1} \times \left( V \times \frac{dP}{d\theta} + P \times \kappa \times \frac{dV}{d\theta} \right) \quad (1)$$

$$Q = \sum \frac{dQ}{d\theta} \quad (2)$$

$$MFB = \frac{Q(\theta) - Q(\theta_{min})}{Q(\theta_{max}) - Q(\theta_{min})} \times 100 \quad (3)$$

Where, in the above equation (1), P represents an in-cylinder pressure, V represents an in-cylinder volume and κ represents a ratio of specific heat of in-cylinder gas. Further, in the above equation (3), $\theta_{min}$ represents a combustion start point (0% combustion point CA0), and $\theta_{max}$ represents a combustion end point (100% combustion point CA100).

(Schematic Configuration Example of in-Cylinder Pressure Sensor)

Figure 2:
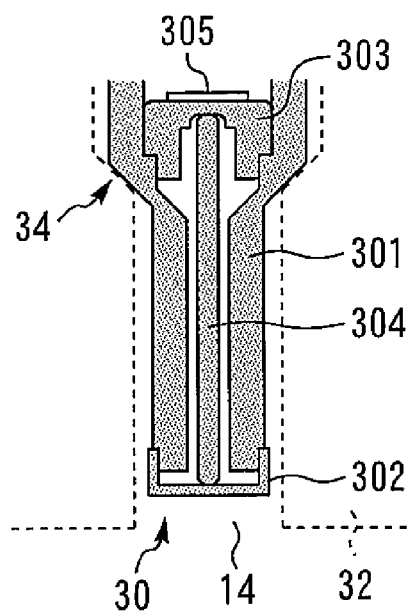
FIG. 2 is a cross-sectional diagram that schematically illustrates one example of the configuration of a main portion of an in-cylinder pressure sensor.

FIG. 2 is a cross-sectional diagram that schematically illustrates one example of the configuration of a main portion of the in-cylinder pressure sensor 30. The in-cylinder pressure sensor 30 illustrated in FIG. 2 includes a cylindrical housing 301. A diaphragm 302 that is a pressure receiving member that receives an in-cylinder pressure is mounted at one end of the housing 301 (that is, the tip of the in-cylinder pressure sensor 30). A bowl-shaped strain member 303 is disposed at an intermediate site of the housing 301 so as to block off an internal space of the housing 301 on the sensor tip side. A rod-shaped transmitting member 304 is disposed inside the housing 301. The transmitting member 304 is interposed between the diaphragm 302 and the strain member 303. According to this configuration, a compressive load that is based on the in-cylinder pressure is transmitted from the diaphragm 302 to the strain member 303 via the transmitting member 304.

A strain gauge element 305 is mounted on a surface of the strain member 303 on an opposite side to a surface that the transmitting member 304 contacts. The strain gauge element 305 generates an output in accordance with the amount of strain on the strain member 303 that is caused by the aforementioned compressive load. The output of the strain gauge element 305 has a correlation with the in-cylinder pressure. Therefore, according to the in-cylinder pressure sensor 30, the in-cylinder pressure can be detected based on the output of the strain gauge element 305. Note that, although in this case an example of a configuration that uses the strain gauge element 305 is illustrated, the same basic configuration of the main portion also applies with respect to an in-cylinder pressure sensor that utilizes a piezoelectric element as a pressure detecting element. That is, even in the case of a piezoelectric element, the point that a compressive load based on an in-cylinder pressure is input from a pressure receiving member through an intermediate member such as an electrode or directly to the piezoelectric element and that the piezoelectric element generates an output in accordance with the input compressive load is the same.

(Seal Between in-Cylinder Pressure Sensor and Wall Surface of Combustion Chamber)

Figure 3A:
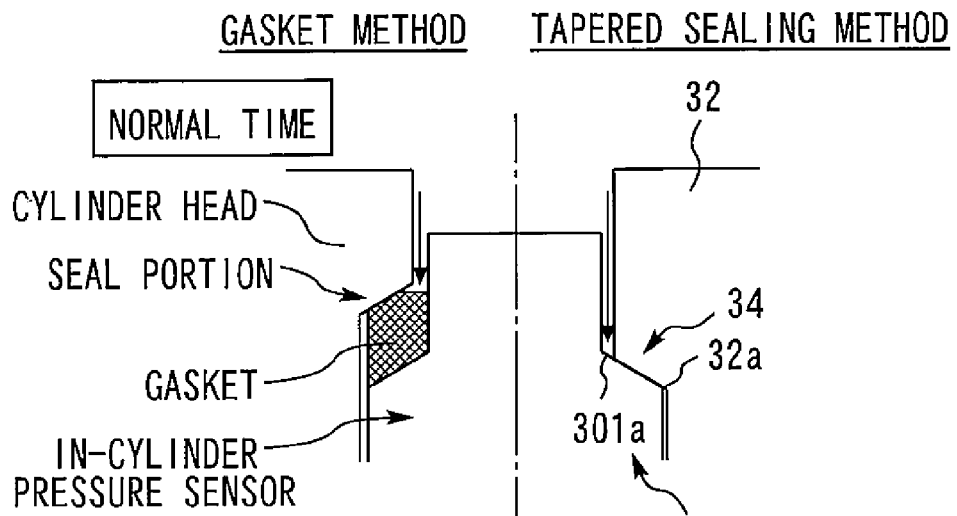
FIGS. 3A and 3B are views for describing a method by which a seal portion seals a space between an in-cylinder pressure sensor and a wall surface of a combustion chamber.
Figure 3B:
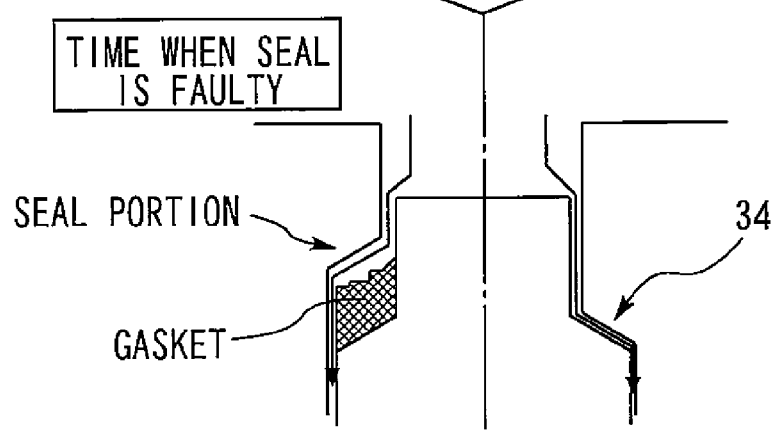

FIGS. 3A and 3B are views for describing a method by which a seal portion seals a space between the in-cylinder pressure sensor 30 and the wall surface of the combustion chamber 14. The seal portion 34 is provided between the in-cylinder pressure sensor 30 and the wall surface of the combustion chamber 14 (basically, the wall surface of the cylinder head 32) that surrounds the in-cylinder pressure sensor 30. The seal portion 34 seals a space between the in-cylinder pressure sensor 30 and the aforementioned wall surface so that gas inside the cylinder does not leak to the outside through the space. A tapered sealing method or a gasket method is mainly used as a sealing method. In FIGS. 3A and 3B, to facilitate the description, both methods are illustrated together in a single drawing in which a center line of the in-cylinder pressure sensor 30 serves as a boundary. Note that the configuration example of the in-cylinder pressure sensor 30 illustrated in FIG. 2 is an example in which the tapered sealing method is adopted.

The sealing methods will now be described taking the in-cylinder pressure sensor 30 as an example. The tapered sealing method is a method that brings a tapered portion 301a and a tapered portion 32a into intimate contact with each other. The tapered portion 301a has a tapered shape that is formed in the outer face of the housing 301. The tapered portion 32a is a portion of the wall surface of the cylinder head 32 that opposes the tapered portion 301a. The gasket method is a method that utilizes a gasket (seal member) that is interposed between the outer face of the housing and the wall surface of the cylinder head.

(Decline in Detection Accuracy of in-Cylinder Pressure Due to Abnormality in Sealing Function of Seal Portion)

When a seal portion is provided at a position that is further on the combustion chamber side relative to the pressure detecting element in the axial direction of the housing, as in the configuration illustrated in FIG. 2, there is a problem that the accuracy of detecting the in-cylinder pressure decreases if an abnormality arises in the sealing function of the seal portion.

Figure 4A:
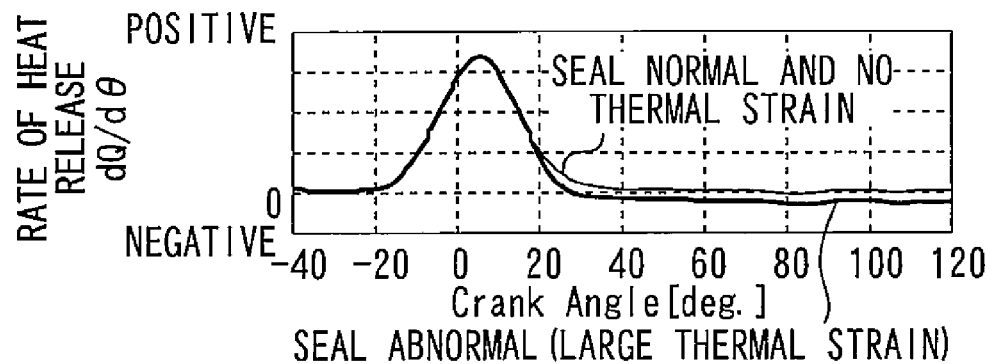
FIGS. 4A to 4D are views that represent results of analyzing an in-cylinder pressure waveform during combustion.
Figure 4B:
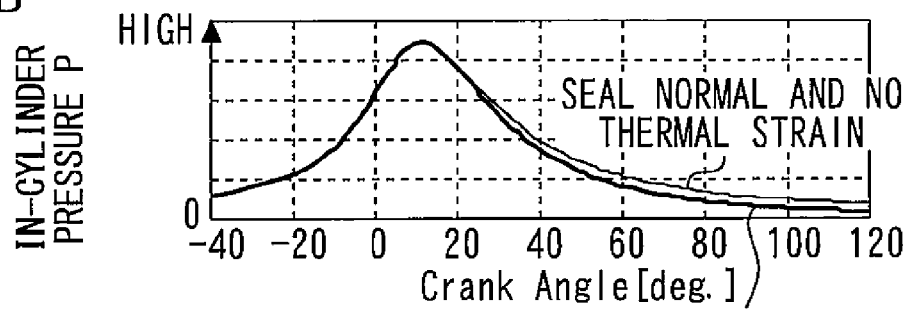
Figure 4C:
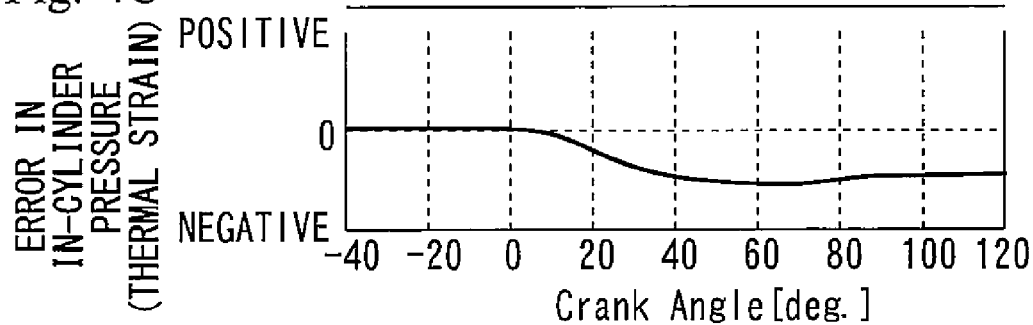
Figure 4D:
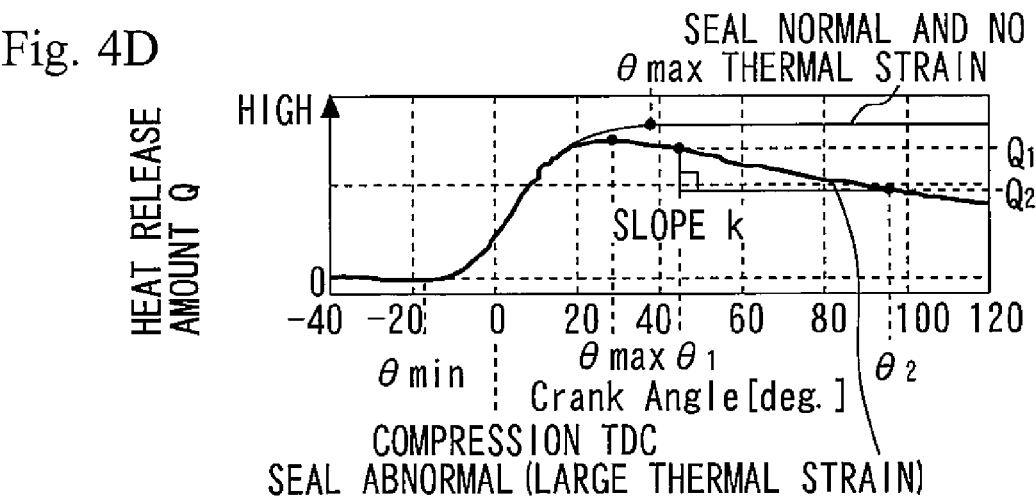

FIGS. 4A to 4D are views that illustrate results of analyzing in-cylinder pressure waveforms during combustion. FIG. 4B shows a waveform of a detected value of an in-cylinder pressure P obtained using the in-cylinder pressure sensor 30. FIG. 4A shows a waveform of a calculated value of a rate of heat release (dQ/dθ). FIG. 4C shows a waveform of a calculated value of a difference between an in-cylinder pressure represented by a thin line and an in-cylinder pressure represented by a thick line in FIG. 4B, that is, a detection error in an in-cylinder pressure due to the influence of thermal strain (hereunder, referred to simply as "thermal strain error"). FIG. 4D shows a waveform of a calculated value of a heat release amount Q. Further, a waveform represented by a thin line in the respective drawings of FIGS. 4A to 4D is a waveform at a time when the sealing function of the seal portion 34 is normal and a thermal strain is not being generated (that is, a waveform corresponding to an actual value), while on the other hand a waveform represented by a thick line is a waveform at a time when an abnormality has arisen in the sealing function (time of a large thermal strain).

First, a thermal strain of the in-cylinder pressure sensor 30 that is a premise for the aforementioned problem will be described. The sensor tip portion of the in-cylinder pressure sensor 30 is exposed in the combustion chamber 14. Consequently, upon being exposed to high temperature combustion gas inside the combustion chamber 14, a phenomenon occurs whereby the sensor tip portion changes shape (that is, thermal strain). If thermal strain occurs in the diaphragm 302 that is included in the sensor tip portion, the diaphragm 302 expands in a direction away from the transmitting member 304. As a result of this deformation, the amount of force by which the diaphragm 302 presses the strain member 303 via the transmitting member 304 decreases. Further, the mode of transmission of heat from the combustion gas to the sensor tip portion differs between the housing 301 that is a member on the outer side of the sensor tip portion and the transmitting member 304 that is a member on the inner side of the sensor tip portion. More specifically, because of the fact that heat is transmitted to the transmitting member 304 on the inner side slower than to the housing 301 on the outer side, thermal expansion of the transmitting member 304 occurs later than thermal expansion of the housing 301. This transient difference in the thermal expansion makes the decrease prominent in the amount by which the strain member 303 is pressed.

If the amount by which the strain member 303 is pressed decreases as a result of thermal strain, a detected value for the in-cylinder pressure P will become a smaller value than a value corresponding to the actual pressure (see thin line in FIG. 4B). That is, a thermal strain error will arise. The waveform for the rate of heat release (dQ/dθ) in FIG. 4A shows a heat amount that is received by the sensor tip portion from gas or a flame in the cylinder and also shows a timing at which the heat is received. The heat input to the sensor tip portion reaches a maximum at a timing at which the rate of heat release exhibits a peak. Further, as shown in FIG. 4C, due to, for example, the influence of a delay in the transmission of heat from combustion gas to the sensor tip portion, the thermal strain error increases after a small delay relative to the start of heat release (that is, the start of heat input to the sensor) that is shown in FIG. 4A.

If the detected value of the in-cylinder pressure P is less than the actual pressure due to a thermal strain error, as shown in FIG. 4A, the rate of heat release sometimes becomes a negative value. If the rate of heat release becomes a negative value, the heat release amount Q obtained by calculating the rate of heat release as shown in the above equation (2) decreases. More specifically, as shown by the thin line in FIG. 4D, in a case where the sealing function is normal and a thermal strain error has not arisen, the heat release amount Q is constant from the combustion end point $\theta_{max}$ onwards. On the other hand, if a thermal strain error arises, even if the sealing function is normal, the heat release amount Q starts to decrease from the vicinity of the combustion end point $\theta_{max}$. As a result, a slope k arises that is a ratio of the amount of decrease in the heat release amount Q relative to the amount of increase in the crank angle.

If an abnormality arises in the sealing function, the amount of decrease in the value detected of the in-cylinder pressure P increases in the manner illustrated by the waveform represented by a thick line in FIG. 4B. As a result, a detection error in the in-cylinder pressure due to thermal strain increases. The reason is as follows. Namely, with respect to the space between the housing 301 and the wall surface of the combustion chamber 14, if the sealing function of the seal portion 34 is normal, as shown in FIG. 3A, high temperature combustion gas only flows in a gap on the tip side relative to the position at which the seal portion 34 is provided. In contrast, as shown in FIG. 3B, in a case where an abnormality arises in the seal portion 34 and the sealing function declines, the high temperature combustion gas flows in a gap on the deep side that is beyond the seal portion 34. As a result, the amount of heat that is supplied from the combustion gas to members (that is, the transmitting member 304 and the strain member 303) that are positioned on the transmission path of the compressive load from the diaphragm 302 to the strain gauge element 305 increases. Consequently, if an abnormality arises in the sealing function, a detection error (that is, a thermal strain error) with respect to the in-cylinder pressure that is due to thermal strain on the sensor tip portion that is involved in detection of the pressure from the diaphragm 302 to the strain gauge element 305 increases. Consequently, as shown by the thick line in FIG. 4D, if an abnormality arises in the sealing function, the slope k increases in comparison to when the sealing function is normal.

Note that, in the case of the tapered sealing method, an abnormality in the sealing function arises when the seal face becomes loose due to stress relaxation in the sealing face or due to foreign matter biting into the sealing face or the like. Further, in the case of the gasket method, an abnormality in the sealing function arises when erosion or damage to the gasket occurs, foreign matter bites into the sealing face, or a large scratch arises in the sealing face. Further, as described above, thermal strain is a phenomenon that arises in an expansion stroke accompanying combustion. A thermal strain error gradually decreases when the heat input to the sensor tip portion ceases after the end of combustion, and is eliminated by the time the next cycle is reached. That is, under circumstances in which thermal strain occurs, a process whereby thermal strain arises in the same period as combustion and this thermal strain ends in the cycle in which it arose is repeated. Accordingly, a change in the waveform of the in-cylinder pressure that is caused by thermal strain differs from a time when a leakage of compressed gas occurs within a cylinder due to a reason such as wear of a piston ring, and such a change does not occur during a period from when the intake valve 20 closes until ignition occurs and combustion begins.

[Determination of Abnormality in Sealing Function of Seal Portion in First Embodiment]

A feature of the system of the present embodiment is that the existence or nonexistence of an abnormality in the sealing function of the seal portion 34 on the actual machine can be determined utilizing the ratio X that is based on the slope k of the heat release amount Q and the engine speed.

(Technique for Actively Generating Thermal Strain Error when Abnormality Arises in Sealing Function)

In order to enable accurate abnormality determination utilizing the size of the slope k, it is preferable to adopt a configuration so that a sufficient difference between the sizes of the slope k arises between a time when the sealing function is normal and a time when the sealing function is abnormal. As described above, the slope k increases as a result of the heat release amount Q significantly undershooting in an expansion stroke in which the thermal strain error increases. A thermal strain error, for example, can be actively generated at a time that an abnormality arises in the sealing function by using the following technique. Therefore, in order to perform an abnormality determination with respect to the sealing function, it is preferable to adopt a configuration that is in accordance with the following technique.

That is, if the seal portion 34 is provided at a position that is further on the combustion chamber 14 side than the strain gauge element 305 in the axial direction of the housing 301, when an abnormality arises in the sealing function, a heat input amount with respect to members (that is, the transmitting member 304 and the strain member 303) that are positioned on the transmission path of the compressive load from the diaphragm 302 to the strain gauge element 305 increases. Therefore, in order to actively generate a thermal strain error, for example, it is conceivable to set the length of an area from the diaphragm 302 to the strain gauge element 305 to a long length. At an initial stage of heat input, a transient thermal expansion difference that is caused by a difference in the ease of heat conduction between the housing 301 that is on the outside and the transmitting member 304 that is on the inside arises. If the length of a member is long, the amount of expansion of the member with respect to a certain temperature rise will increase. Thus, if the length of the aforementioned area is long, the amount of expansion of this area with respect to a certain temperature rise will increase. Therefore, according to the aforementioned setting of the length of the area, when a thermal expansion difference arises, the relative amount of expansion of the housing 301 with respect to the amount of expansion of the transmitting member 304 will increase. Consequently, the thermal strain error will increase. Further, in order to actively generate a thermal strain error, for example, it is conceivable to select the material of the housing 301 and the material of the transmitting member 304 so that a coefficient of linear expansion of the housing 301 is greater than a coefficient of linear expansion of the transmitting member 304.

A technique for calculating the slope k will now be described. A thermal strain error arises accompanying combustion. A position at which the calculated value of the heat release amount Q begins to decrease due to a thermal strain error is the combustion end point $\theta_{max}$ in the data for the heat release amount Q (the crank angle at which the heat release amount Q exhibits a maximum value in the data for the heat release amount Q). Therefore, it can be said that as long as the relevant position is during a crank angle period from the combustion end point $\theta_{max}$ to the opening timing of the exhaust valve 22, the linearity of the waveform of the heat release amount Q is ensured. Therefore, the slope k can be calculated based on data for the heat release amount Q at an arbitrary two points that are synchronized with the crank angle during the relevant crank angle period. Further, the number of items of data for the heat release amount Q that are used to calculate the slope k is not limited to two, and may be three or more. Specifically, for example, a configuration may be adopted that, after calculating a plurality of slopes k by arbitrarily combining two data items among three or more data items, uses an average value of the calculated plurality of slopes k as a final slope k.

(Properties of Slope k)

Figure 5:
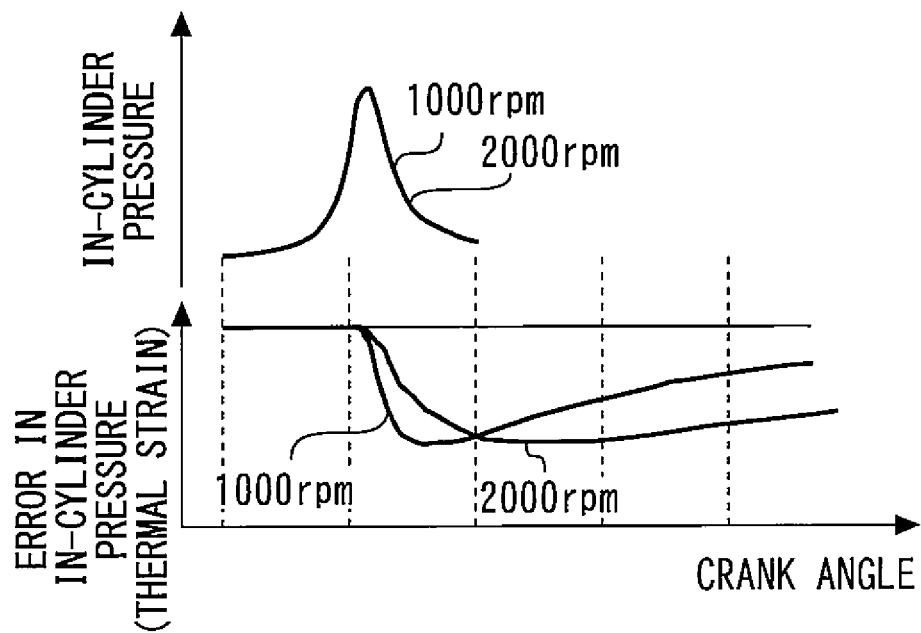
FIG. 5 is a view that illustrates a comparison between waveforms of an in-cylinder pressure and a thermal strain error at different engine speeds, taking the crank angle as a horizontal axis.
Figure 6:
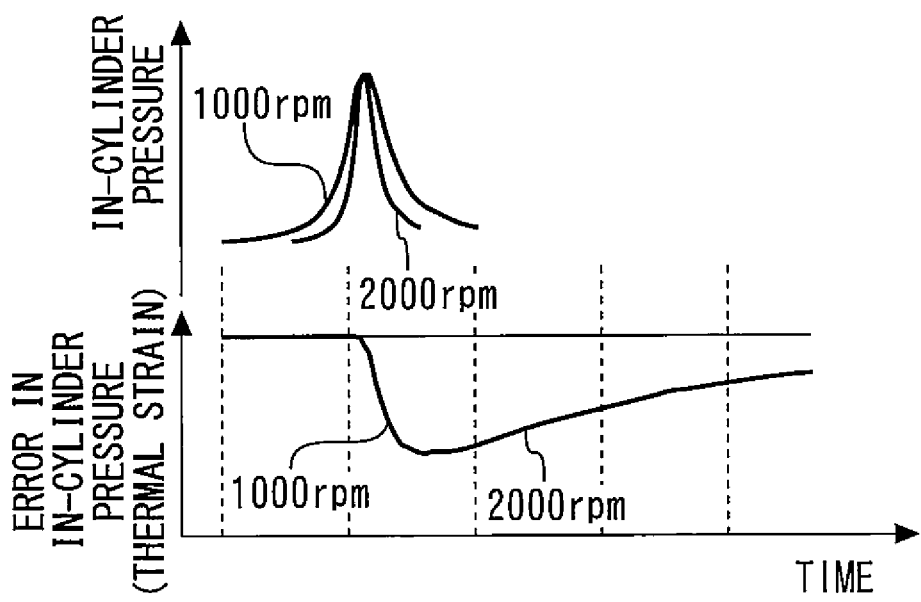
FIG. 6 is a view that illustrates a comparison between waveforms of an in-cylinder pressure and a thermal strain error at different engine speeds, taking time as a horizontal axis.

FIG. 5 is a view that, taking a crank angle as the horizontal axis, illustrates a comparison between waveforms of an in-cylinder pressure and a thermal strain error at different engine speeds. FIG. 6 is a view that, taking time as a horizontal axis, illustrates a comparison between waveforms of an in-cylinder pressure and a thermal strain error at different engine speeds. More specifically, FIG. 5 and FIG. 6 illustrate examples of waveforms when an in-cylinder charged air amount is the same and the engine speeds are different.

From FIG. 5 it is found that, when the crank angle is taken as the criterion, in a case where the engine speed is high, a change in the waveform of the thermal strain error is gradual in comparison to when the engine speed is low. On the other hand, from FIG. 6 it is found that, when time is taken as the criterion, even if the engine speed changes, there is no change in the waveform of the thermal strain error. Thermal strain that arises within a combustion cycle is a phenomenon whereby the sensor tip portion undergoes thermal deformation due to momentary heat input caused by contact with high temperature combustion gas or a flame, and thereafter the deformation disappears. Consequently, as will be understood from these drawings, the amount of change in the thermal strain error during a single cycle is a function of time, and not a function of the crank angle. In other words, the characteristic of a change in the thermal strain error during a single cycle depends on a time constant of thermal deformation that is intrinsic to the in-cylinder pressure sensor. Accordingly, the slope k that arises due to thermal strain error when calculating the heat release amount Q using an in-cylinder pressure that is acquired in synchrony with the crank angle can be normalized utilizing the engine speed.

A supplementary description will now be given regarding the influence of an in-cylinder charged air amount KL on the thermal strain error. The equation of state of gas is represented by the following equation (4), where P represents the in-cylinder pressure, V represents the cylinder volume, n represents the number of moles of the in-cylinder gas (that is, the working gas), R represents the gas constant and T represents the temperature of the in-cylinder gas. The number of moles of the in-cylinder gas is proportional to the in-cylinder charged air amount KL. Therefore, equation (4) can be transformed as shown in equation (5). When the in-cylinder charged air amount KL increases, the in-cylinder pressure increases in proportion thereto. Hence, based on equation (5) it can be said that the temperature T of the in-cylinder gas does not change even if the in-cylinder charged air amount KL increases. That is, the in-cylinder charged air amount KL can be regarded as having almost no influence on a thermal strain error. Additionally, although strictly speaking the temperature T of the in-cylinder gas is influenced in some way by turbulence of an air flow that accompanies an increase in the in-cylinder charged air amount KL, this influence is of an ignorable level. Based on the foregoing facts also, it can be said that the dominant parameter for the slope k among the operating condition parameters relating to the operating conditions of the internal combustion engine 10 is the engine speed.

$$PV = nRT \quad (4)$$

$$T \propto \frac{P \times V}{KL} \quad (5)$$

(Overview of Abnormality Determination Technique for Sealing Function)

Figure 7:
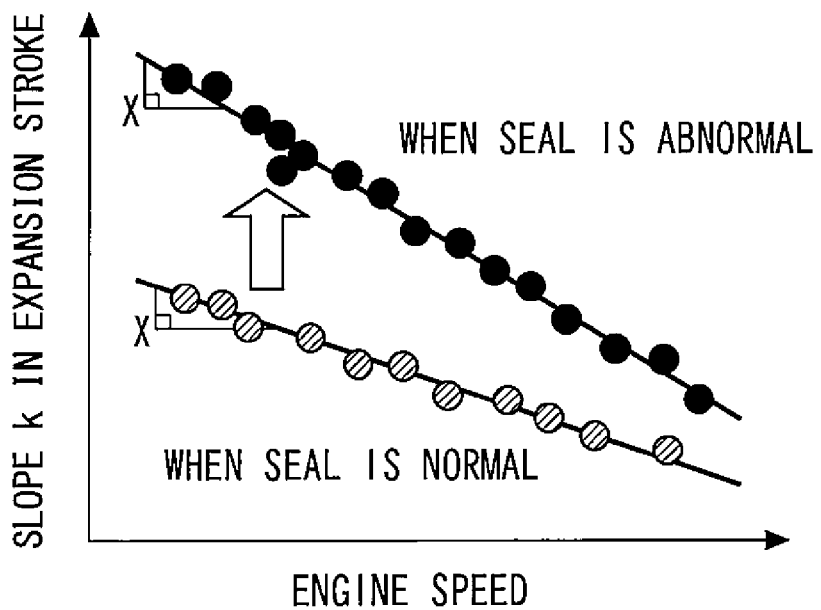
FIG. 7 is a view that illustrates a relation between a slope k of a heat release amount Q in an expansion stroke and the engine speed.

FIG. 7 is a view which represents the relation between the slope k of the heat release amount Q in an expansion stroke and the engine speed. Because the slope k has the above described properties, a relation that the ratio X of the amount of decrease in the slope k relative to the amount of increase in the engine speed is a constant value exists between the slope k and the engine speed. The ratio X corresponds to an inclination of a linear approximate curve corresponding to respective plotted points in a case where the slope k is plotted for each predetermined engine speed on an xy-plane for which the engine speed is taken as an x-coordinate value and the slope k is taken as a y-coordinate value.

As shown in FIG. 7, the slope k decreases as the engine speed increases. This is because, as the engine speed increases, a crank angle period that passes while the heat release amount Q decreases by the same amount within a certain time period lengthens. In addition, based on FIG. 7 it is found that when an abnormality has arisen in the sealing function, the ratio X of the amount of decrease in the slope k relative to the amount of increase in the engine speed increases in comparison to when the sealing function is normal (in other words, the inclination of the linear approximate curve described above increases to the minus side).

Therefore, in the present embodiment, a configuration is adopted that acquires the value of the slope k for each predetermined engine speed segment during operation of the internal combustion engine 10 and calculates the corresponding ratio X. If the calculated ratio X is larger than a predetermined threshold value α, it is determined that there is an abnormality in the sealing function of the seal portion 34.

Figure 8:
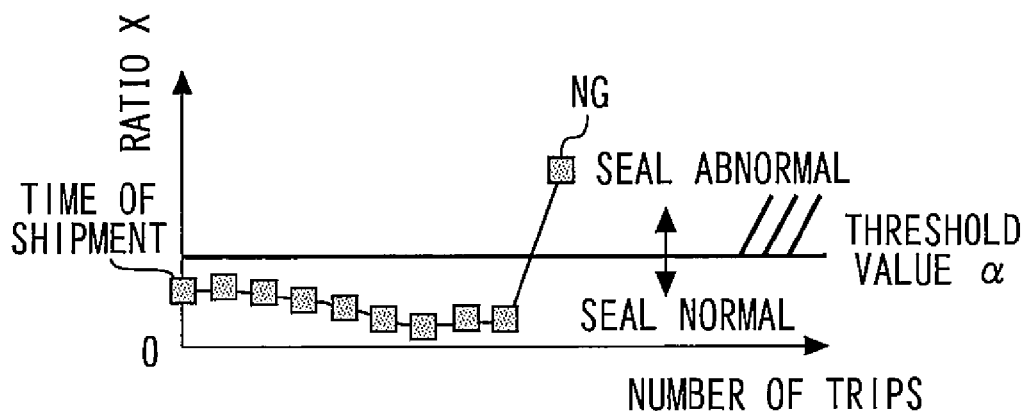
FIG. 8 is a view that illustrates an example of detecting an abnormality in a sealing function.

FIG. 8 is a view that illustrates an example of detection of a sealing function abnormality. The horizontal axis represents the number of trips of the vehicle in which the internal combustion engine 10 is mounted. During operation of the internal combustion engine 10, in order to calculate the ratio X, calculation of the slope k is performed for each cycle of the internal combustion engine 10 with the exception of an exceptional operating condition that is described later. For each predetermined engine speed segment within a predetermined engine speed range that is the object of calculation, the slope k is stored in a buffer of the ECU 40 in association with an engine speed value that represents the corresponding individual engine speed segment. Acquisition of the slope k in the respective engine speed segments is performed for only a predetermined number of cycles. Specifically, as shown in FIG. 7, points are plotted on an xy-plane that is defined by the engine speed and the slope k. Subsequently, when data for the predetermined number of cycles has been accumulated in the respective engine speed segments, calculation of the ratio X is performed.

In the example illustrated in FIG. 8, the ratio X is acquired also during test operation prior to shipment of the internal combustion engine 10. According to this example, at the time of shipment, the ratio X is less than the threshold value α. Thereafter, the ratio X is compared with the threshold value α at the time of each trip. According to this example, the ratio X exceeds the threshold value α at the time of the ninth trip. Consequently, at the time of the eighth trip, it is determined that an abnormality has arisen in the sealing function. Further, by performing an abnormality determination at the time of shipment also as in this example, the present determination can be put to practical use for a process of checking whether or not the in-cylinder pressure sensor 30 has been assembled normally.

(Specific Processing in First Embodiment)

Figure 9:
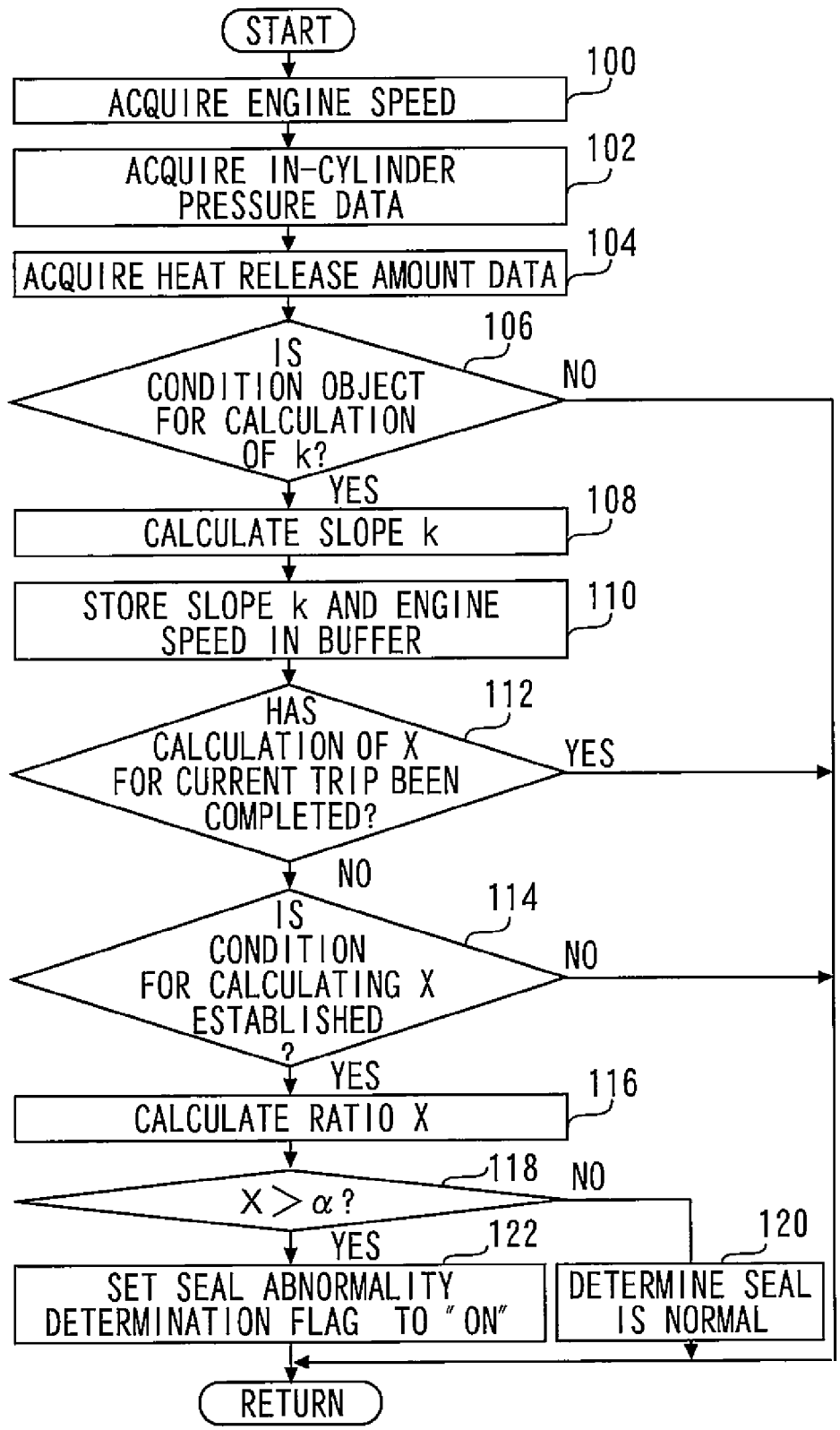
FIG. 9 is a flowchart illustrating a routine that is executed in a first embodiment of the present invention.

FIG. 9 is a flowchart illustrating a routine that the ECU 40 executes for realizing an abnormality determination with respect to the sealing function of the seal portion 34 in the first embodiment of the present invention. Note that it is assumed that the present routine is repeatedly executed for each cycle with respect to each in-cylinder pressure sensor 30 (that is, for each cylinder) mounted in the internal combustion engine 10.

In the routine illustrated in FIG. 9, first the ECU 40 acquires the engine speed in the current cycle using the crank angle sensor 42 (step 100). Next, the ECU 40 uses the in-cylinder pressure sensor 30 and the crank angle sensor 42 to acquire in-cylinder pressure data that is synchronized with the crank angle (step 102). Subsequently, the ECU 40 utilizes the acquired in-cylinder pressure data to calculate data for the heat release amount Q that is synchronized with the crank angle (step 104).

Next, the ECU 40 determines whether or not the present operating condition of the internal combustion engine 10 is a condition that is an object for calculation of the slope k (step 106). As described above, the engine speed is the dominant operating condition parameter for the slope k. However, under operating conditions in which the burning velocity changes extremely, a change in the burning velocity will affect the slope k. Accordingly, it is desirable not to calculate the slope k under such operating conditions. Specifically, it is preferable that operating conditions in which combustion is extremely slow, such as when a large amount of EGR gas is introduced at an EGR rate that is greater than a predetermined value or when lean combustion is performed under an air-fuel ratio that has been made significantly lean, are excluded from the conditions that are an object for calculation of the slope k. Therefore, in the present embodiment, a configuration is adopted so that calculation of the slope k is performed under operating conditions at which combustion is performed at the stoichiometric air-fuel ratio. As a result, an abnormality determination can be performed with respect to the sealing function while reliably avoiding operating conditions in which the combustion state affects the accuracy of the abnormality determination due to the combustion becoming extremely slow. Further, a cycle in which abnormal combustion such as preignition occurred is also excluded from the objects for calculation of the slope k.

If the result determined in step 106 is affirmative, the ECU 40 proceeds to step 108 to calculate the slope k. Specifically, from the data for the heat release amount Q calculated in step 104, the ECU 40 acquires a first heat release amount $Q_1$ and a second heat release amount $Q_2$ that are data items for the heat release amount Q at a first crank angle $\theta_1$ and a second crank angle $\theta_2$, respectively (see FIG. 4D for an acquisition example). The first crank angle $\theta_1$ and the second crank angle $\theta_2$ are previously set as two points in a crank angle period from the combustion end point $\theta_{max}$ to the opening timing of the exhaust valve 22. The second crank angle $\theta_2$ is a crank angle $\theta$ that is further to the retard side relative to the first crank angle $\theta_1$. The ECU 40 calculates the slope k as a ratio (that is, $(Q_1-Q_2)/(\theta_2-\theta_1)$) of the amount of decrease in the heat release amount Q (that is, $Q_1-Q_2$) with respect to the amount of increase (that is, $\theta_2-\theta_1$) in the crank angle $\theta$. Note that, as described above, the number of data items of the heat release amount Q that are used to calculate the slope k is not limited to two, and may be three or more. Next, the ECU 40 stores the slope k calculated in step 108 in a buffer that is a temporary storage area of the ECU 40 in a state in which the slope k is associated with the engine speed acquired in step 100 (step 110).

Next, the ECU 40 determines whether or not calculation of the ratio X for the current trip of the vehicle has been completed (step 112). If the result determined in step 112 is affirmative, the ECU 40 promptly ends the processing for the current cycle. In contrast, if calculation of the ratio X has not been completed, the ECU 40 determines whether or not a condition for calculating the ratio X is established (step 114). In this manner, calculation of the ratio X is performed once for each trip. As described above, calculation of the slope k is performed for only a predetermined number of cycles for each predetermined engine speed segment within a predetermined engine speed range that is a calculation object. The calculation condition in the present step 114 is established at a time that calculation of the slope k for the predetermined number of cycles in each engine speed segment that is an object has been completed.

If the result determined in step 114 is affirmative, the ECU 40 proceeds to step 116. In step 116 the ECU 40 calculates the ratio X utilizing data for the slope k that is stored in the buffer (that is, the slope k associated with the engine speed). The ratio X corresponds to an inclination of a linear approximate curve at respective plotted points of the slope k on an xy-plane for which the engine speed is taken as an x-coordinate value and the slope k is taken as a y-coordinate value as shown in FIG. 7. Therefore, in the present step 116, the ECU 40 applies the method of least squares to the data of the slope k stored in the buffer and calculates the aforementioned approximate straight line. The ECU 40 then calculates an inclination of the calculated approximate straight line as the ratio X. In this case, it can be said that it is possible to calculate the ratio X (inclination of the approximate straight line) as long as there are at least two plotted points. Accordingly, the ratio X may be calculated using, for example, two plotted points. However, utilizing plotted points corresponding to a predetermined number of cycles in many engine speed segments as in the technique described in the present embodiment enables the reliability of the ratio X that is calculated to be favorably secured.

Next, the ECU 40 determines whether or not the ratio X calculated in step 116 is greater than the threshold value $\alpha$ (step 118). The threshold value $\alpha$ is a value that is adapted in advance as a value that enables a determination regarding the existence or nonexistence of an abnormality of the sealing function. More specifically, even when the sealing function is normal, a thermal strain error itself exists even though the level thereof is small compared to a time when an abnormality has arisen. Therefore, it is sufficient to ascertain in advance, by experimentation or the like, the ratio X at a time when the sealing function is normal with respect to an in-cylinder pressure sensor mounted in an internal combustion engine, and set the threshold value $\alpha$ by taking the ratio X at a normal time as a reference value. Further, a configuration may also be adopted so as to use the ratio X acquired during trial operation at the time of shipment as a reference value, and perform an abnormality determination based on the magnitude of an amount of change from the reference value. By this means, it is possible to perform a determination that takes into account variations due to individual differences between in-cylinder pressure sensors mounted in an internal combustion engine and variations with respect to assembly of in-cylinder pressure sensors in an internal combustion engine.

In a case where the ratio X is equal to or less than the threshold value $\alpha$, the ECU 40 determines that the sealing function of the seal portion 34 is normal (step 120). On the other hand, in a case where the ratio X is larger than the threshold value $\alpha$, the ECU 40 determines that an abnormality has arisen in the sealing function of the seal portion 34, and turns a seal abnormality determination flag "on" (step 122). In this case, in order to notify the driver that the sealing function is abnormal, the malfunction indicator lamp 46 is lit or the like.

As mentioned previously, the engine speed is the dominant operating condition parameter with respect to the slope k. Further, as shown in FIG. 7, when an abnormality arises in the sealing function, the ratio X of the amount of decrease in the slope k relative to the amount of increase in the engine speed increases. Consequently, in a case where the ratio X is greater than the threshold value $\alpha$ as in the processing of the routine illustrated in FIG. 9 that is described above, it can be determined that an abnormality has arisen in the sealing function of the seal portion 34. Thus, according to the technique of the present embodiment, by monitoring the thermal response characteristics of the in-cylinder pressure sensor 30 utilizing the ratio X that is an abnormality determination index value that is based on the slope k and the engine speed, the existence or nonexistence of an abnormality in the sealing function can be determined.

In addition, the size of the slope k itself changes accompanying a change in the heat input amount to the sensor tip portion accompanying a decrease in the sealing performance of the seal portion 34. With respect to the relation with the operating condition parameters, it can be said that the engine speed is the dominant influence on the slope k, and that the slope k basically is not influenced by other operating condition parameters such as the in-cylinder charged air amount KL (however, as described in the foregoing, this excludes operating conditions under which combustion becomes extremely slow, or under which the burning velocity becomes extremely high such as when abnormal combustion occurs). Therefore, by utilizing the ratio X, an abnormality determination index value can be obtained that does not depend on operating condition parameters other than the engine speed. By this means, the number of adaptation steps for determining an abnormality of the sealing function can be kept to a low number.

In the above described first embodiment, a configuration is adopted that calculates the ratio X for each trip of the vehicle in which the internal combustion engine 10 is mounted, and compares this ratio X with the threshold value α. However, a configuration may also be adopted so as to perform an abnormality determination with respect to the sealing function of the seal portion in the present invention using the following technique, excluding a case in which an abnormality determination is performed when shipping the internal combustion engine 10. That is, a ratio X calculated during operation of the internal combustion engine 10 is stored as a previous value in the ECU 40 for use when performing an abnormality determination at the time of the next trip. Subsequently, if a difference between the ratio X calculated at the time of the current trip and the previous value is greater than a predetermined determination value, it may be determined that an abnormality has arisen in the sealing function of the seal portion 34. Note that, it can be said that by regarding the sum of the above described determination value and the previous value as a threshold value, this technique also corresponds to one which performs a determination according to the present invention that an abnormality has arisen in the sealing function in a case where the second ratio (ratio X) is greater than the first threshold value.

Second Embodiment

Next, a second embodiment of the present invention will be described referring mainly to FIG. 10 and FIG. 11. The system of the present embodiment can be realized by using the hardware configuration illustrated in FIG. 1, and causing the ECU 40 to execute the routine shown in FIG. 11, described later, instead of the routine shown in FIG. 9.

[Determination of Abnormality in Sealing Function of Seal Portion in Second Embodiment]

Figure 10:
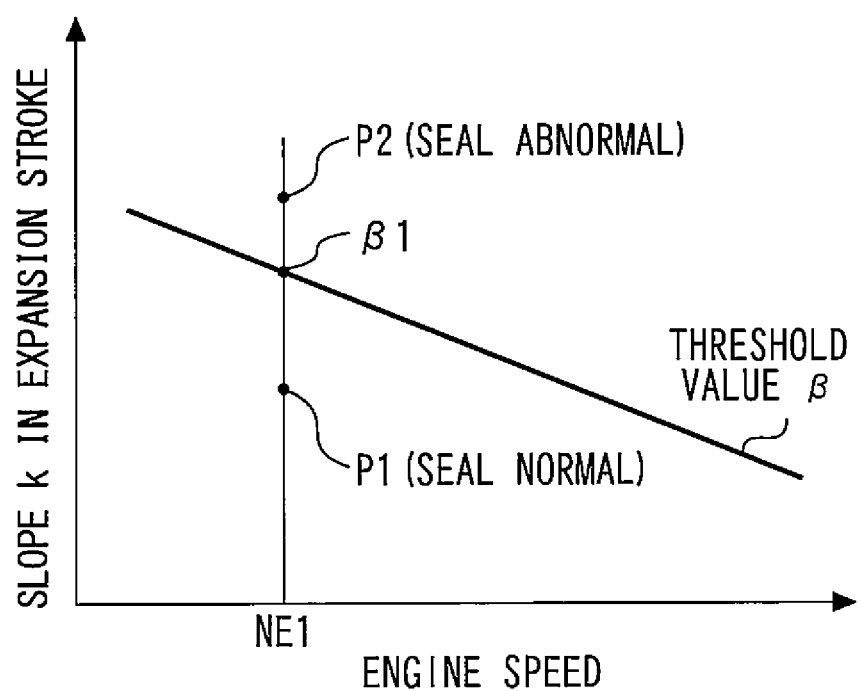
FIG. 10 is a view for describing a technique for determining an abnormality in a sealing function of a seal portion that is used in a second embodiment of the present invention.

FIG. 10 is a view for describing a technique for determining an abnormality in the sealing function of the seal portion 34 that is used in the second embodiment of the present invention. In the above described first embodiment, an abnormality determination technique was described in which a ratio X of an amount of decrease in the slope k relative to an amount of increase in the engine speed is utilized as an index value.

In contrast, according to the abnormality determination technique of the present embodiment, the existence or nonexistence of an abnormality in the sealing function of the seal portion 34 is determined based on whether or not a calculated slope k is greater than a predetermined threshold value β that corresponds to an engine speed in a cycle in which the in-cylinder pressure data that serves as the basis for calculation of this slope k was acquired. Specifically, as shown in FIG. 10, a case where the engine speed in the cycle in which the slope k was calculated is NE1 is taken as an example, and it is determined that the sealing function is normal in a case where the slope k is equal to or less than a threshold value β1 for the engine speed NE1, such as at a point P1. On the other hand, it is determined that an abnormality has arisen in the sealing function in a case where the slope k is greater than the threshold value β1, such as at a point P2.

Based on the same idea as that for the setting of the threshold value α in the first embodiment, with respect to the threshold value β also, it is sufficient to ascertain in advance, by experimentation or the like, the slope k at a time when the sealing function is normal, and set the aforementioned slope k at the normal time as a reference value. Furthermore, as described above referring to FIG. 7, the slope k decreases as the engine speed increases. In correspondence with this fact, according to the present embodiment, as shown in FIG. 10, the threshold value β is set so as to decrease as the engine speed increases. By this means, the threshold value β can be set more appropriately in a manner that takes into consideration the relation between the slope k and the engine speed.

(Specific Processing in Second Embodiment)

Figure 11:
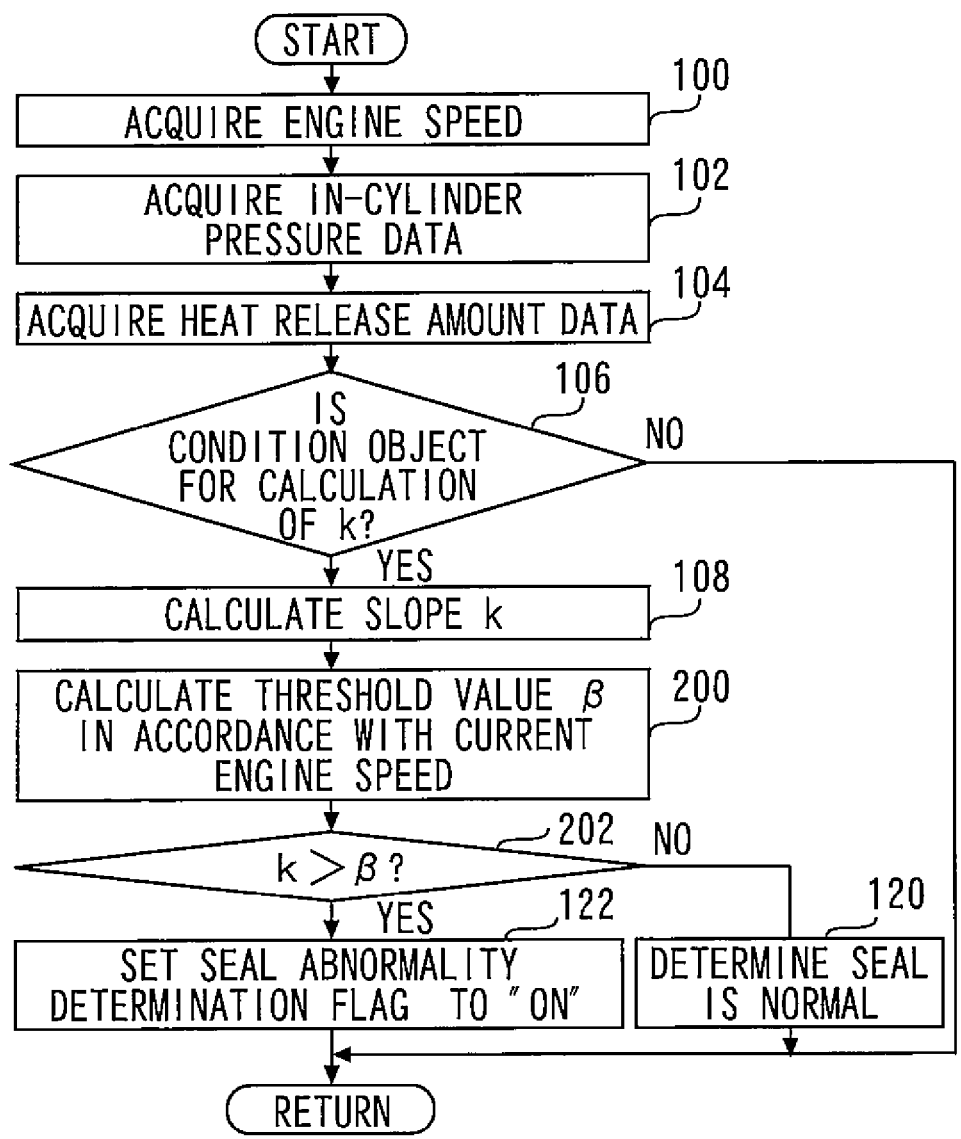
FIG. 11 is a flowchart illustrating a routine that is executed in a second embodiment of the present invention.

FIG. 11 is a flowchart illustrating a routine that the ECU 40 executes for realizing an abnormality determination with respect to the sealing function of the seal portion 34 in the second embodiment of the present invention. In FIG. 11, steps that are the same as steps shown in FIG. 9 according to the first embodiment are denoted by the same reference numerals, and a description of those steps is omitted or simplified.

In the routine shown in FIG. 11, after calculating the slope k in step 108, the ECU 40 proceeds to step 200. The threshold value β that is set so as to decrease as the engine speed increases as shown in FIG. 10 is stored in the ECU 40. In step 200, the ECU 40 calculates that threshold value β in accordance with the current engine speed that was acquired in step 100. Next, the ECU 40 determines whether or not the slope k is greater than the threshold value β (step 202). If the result determined in the present step 202 is negative, the ECU 40 determines that the sealing function is normal (step 120), while if the result determined in the present step 202 is affirmative, the ECU 40 determines that the sealing function is abnormal (step 122).

According to the processing of the routine illustrated in FIG. 11 that is described above also, by monitoring the thermal response characteristics of the in-cylinder pressure sensor 30 utilizing the relation between the slope k and the engine speed, the existence or nonexistence of an abnormality in the sealing function can be determined.

In the above described second embodiment, the threshold value β is set so as to become continuously smaller as the engine speed increases. However, as long as the second threshold value that is set in consideration of the relation between the first ratio (slope k) and the engine speed in the present invention is set so as to become smaller when the engine speed is low in comparison to when the engine speed is high, the threshold value β may be set in a different manner to the manner described above. Specifically, the second threshold value may be set so as to decrease in a stepwise manner in two steps or in three or more steps as the engine speed increases.

Further, in the above described second embodiment, a configuration is adopted so that, after calculating the threshold value β that corresponds to the engine speed in the cycle in which the slope k was calculated, the slope k and the threshold value β are compared. Instead of such processing, an abnormality determination technique may be used that is based on the following processing. That is, a configuration is adopted in which a map that stores an abnormality determination variable using the slope k and the engine speed as input axes is provided in the ECU 40. Specifically, the present map has a map region such as the relation illustrated in FIG. 10, and is a map in which a normal seal region and an abnormal seal region are set by taking the straight line of the threshold value β shown in FIG. 10 as a boundary. An abnormality determination variable is a variable that indicates the existence or nonexistence of an abnormality in the sealing function by using the values 1 and 0, and takes a value of 0 in the normal seal region and a value of 1 in the abnormal seal region. A determination regarding the existence or nonexistence of an abnormality in the sealing function may also be made by referring to the above described map, and determining the existence or nonexistence of an abnormality in the sealing function in accordance with whether the abnormality determination variable is 0 or 1 in the map that corresponds to the slope k and engine speed in a certain cycle.

Further, in the case of utilizing the slope k as in the second embodiment also, a configuration may be adopted so as to make a determination using the same concept as in the modification of the first embodiment that utilizes the previous value and current value of the ratio X. Specifically, with regard to the slope k under the same engine speed, a determination of the existence or nonexistence of an abnormality in the sealing function may be made based on whether or not a difference between a value acquired at the time of the previous trip and a value acquired at the time of the current trip is greater than a predetermined determination value.

Third Embodiment

Next, a third embodiment of the present invention will be described referring mainly to FIG. 12 to FIG. 18. The system of the present embodiment can be realized by using the hardware configuration illustrated in FIG. 1, and causing the ECU 40 to execute the routines shown in FIG. 17 and FIG. 18, described later, instead of the routine shown in FIG. 9.

[Erroneous Detection of Ignition Delay Period Accompanying Occurrence of Abnormality in Sealing Function]

Figure 12A:
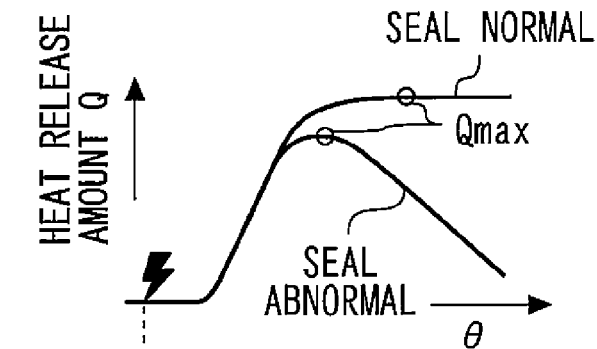
FIGS. 12A and 12B are views for describing error detection with respect to an ignition delay period that accompanies the occurrence of an abnormality in a sealing function of a seal portion.
Figure 12B:
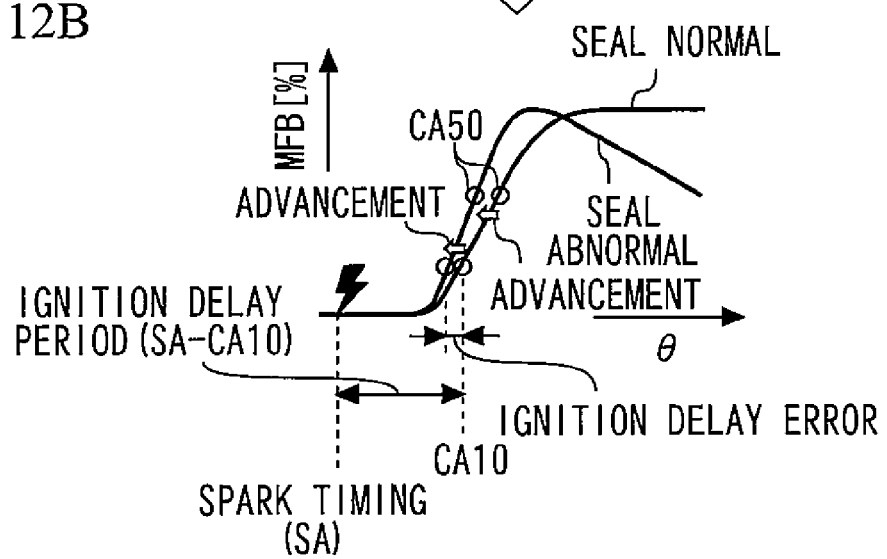

FIGS. 12A and 12B are views for describing erroneous detection of an ignition delay period accompanying the occurrence of an abnormality in the sealing function of the seal portion 34. As shown in FIG. 12A, when an abnormality occurs in the sealing function, due to the influence of thermal strain, the position of the combustion end point $\theta_{max}$ in the data for the heat release amount Q with respect to which the detected value of the in-cylinder pressure sensor 30 was utilized is advanced in comparison to when the sealing function is normal. As a result, when an abnormality arises in the sealing function, as shown in FIG. 12B, a rise in the MFB waveform is steep in comparison to when the seal is normal. An ignition delay period can be calculated as a crank angle period (SA-CA10) from a spark timing SA to a 10% combustion point CA10 utilizing a calculated result for the MFB that is based on the data of the heat release amount Q. However, due to the above described change in the MFB waveform, a detected value of CA10 when an abnormality has arisen in the sealing function is acquired as a value on the advanced side in comparison to when the seal is normal. In accompaniment therewith, the ignition delay period (SA-CA10) when an abnormality has arisen in the sealing function is calculated as a shorter value relative to a value when the seal is normal. That is, the ignition delay period is erroneously detected as a shorter period than the actual ignition delay period.

[Feature Portion of Third Embodiment]
(Correction of Ignition Delay Period (SA-CA10) Based on Ratio X)

When any kind of engine control, determination processing, or estimation processing is performed utilizing an ignition delay period, if an error with respect to the actual value arises in a detected value of the ignition delay period (SA-CA10) (hereunder, may also be referred to simply as an "ignition delay error") due to an increase in the ratio X, the engine control or the like will be affected by the ignition delay error and the accuracy of the control or the like will be unfavorable.

Figure 13:
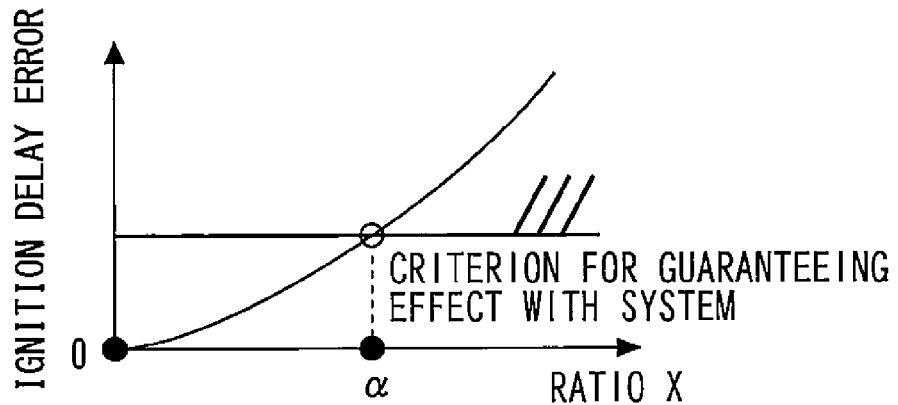
FIG. 13 is a view for describing the manner of setting a threshold value $\alpha$ that is used to determine an abnormality in a sealing function in a third embodiment of the present invention.

FIG. 13 is a view for describing the manner of setting a threshold value cc that is used for determining an abnormality in the sealing function according to a third embodiment of the present invention. As shown in FIG. 13, an ignition delay error increases as the ratio X increases. Accordingly, with the relation illustrated in FIG. 13, it is possible to ascertain the ignition delay error based on the ratio X. Therefore, the threshold value α for detecting an abnormality in the sealing function is determined in advance as a value corresponding to an upper limit of the ignition delay error within a range in which the effect of the above described engine control or the like of the system of the internal combustion engine 10 can be guaranteed.

The system of the present embodiment is similar to the system of the first embodiment in the respect that it is determined that an abnormality has arisen in the sealing function in a case where the ratio X is greater than the threshold value cc. Furthermore, according to the present embodiment, in a case where the ratio X is less than or equal to the threshold value α, SA-CA10 that is an index value of the ignition delay period is corrected in accordance with the value of the ratio X.

Figure 14:
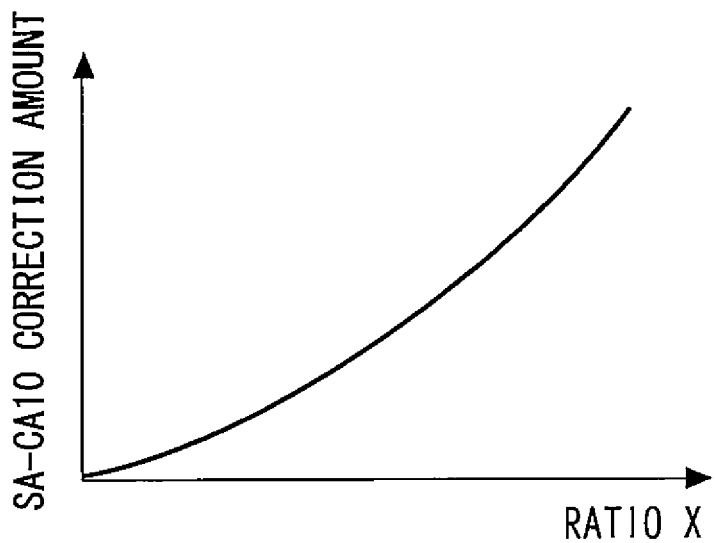
FIG. 14 is a view for describing the manner of setting a correction amount for SA-CA10 that is based on a ratio X.

FIG. 14 is a view for describing the manner of setting the correction amount for SA-CA10 based on the ratio X. As shown in the above described FIG. 13, the ignition delay error increases as the ratio X increases. In correspondence with this fact, as shown in FIG. 14, the correction amount of SA-CA10 is set so as to increase as the ratio X increases.

(Feedback Control of Air-Fuel Ratio and the Like Using SA-CA10)

As one kind of the above described engine control or the like utilizing an ignition delay period based on detected values of the in-cylinder pressure sensor 30, the system of the present embodiment performs feedback control of the air-fuel ratio that utilizes SA-CA10. Specifically, the present feedback control is control that adjusts a fuel injection amount so that a difference between a target SA-CA10 that corresponds to a desired target air-fuel ratio and a detected SA-CA10 becomes zero. In this case, the term "detected SA-CA10" refers to a value for SA-CA10 that is calculated based on detected values of the in-cylinder pressure sensor 30. Note that, the above described feedback control of the air-fuel ratio may be control that adjusts an intake air amount instead of, or as well as, a fuel injection amount. Further, in some cases the ignition delay period can be shortened when the ignition energy is increased. Accordingly, the feedback control of SA-CA10 also includes feedback control of SA-CA10 (that is, the ignition delay period) that is not accompanied by a change in the air-fuel ratio, more specifically, feedback control of SA-CA10 that uses adjustment of the ignition energy. Note that, in this case, it is favorable to perform adjustment of an intake air amount using, for example, a known intake variable valve operating apparatus with which it is possible to control the amount of air that is taken into the cylinders in each cycle with a high level of responsiveness. Further, adjustment of the ignition energy can be performed, for example, by providing a plurality of ignition coils for the spark plug 28 and changing the number of ignition coils that are used for discharge as necessary.

Figure 15:
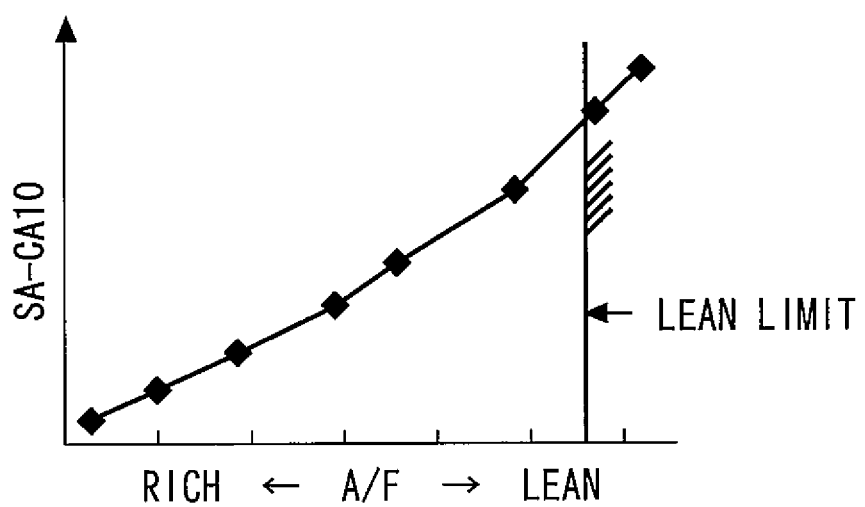
FIG. 15 is a view that represents a relation between SA-CA10 and an air-fuel ratio (A/F)

FIG. 15 is a view that represents the relation between SA-CA10 and the air-fuel ratio (A/F). Based on FIG. 15 it is found that SA-CA10 has a high correlation with the air-fuel ratio. Further, SA-CA10 favorably maintains linearity with respect to the air-fuel ratio in the vicinity of a lean limit also. Here, the term "lean limit" refers to an air-fuel ratio at a lean combustion limit that is determined from the viewpoint of torque fluctuations of the internal combustion engine 10.

It can be said that, for the reasons described hereunder, the degree to which SA-CA10 is representative of the lean limit is higher than the air-fuel ratio itself. That is, although an air-fuel ratio that serves as a lean limit changes according to the operating conditions (for example, increases and decreases in the engine water temperature), SA-CA10 is less liable to change in response to changes in the operating conditions in comparison with the air-fuel ratio. In other words, since the air-fuel ratio that serves as a lean limit depends to a large degree on ignition factors of the air-fuel mixture, it can be said that SA-CA10 that represents an ignition delay is less liable to be affected by the operating conditions than the air-fuel ratio itself. However, since a time per a unit crank angle changes if the engine speed changes, preferably the target SA-CA10 that is a target value of SA-CA10 is set in accordance with the engine speed. More preferably, since SA-CA10 also changes depending on the in-cylinder charged air amount, it is good to set the target SA-CA10 in accordance with the in-cylinder charged air amount instead of, or in addition to, the engine speed. Further, statistical processing is necessary in a case where a configuration is adopted so as to control the air-fuel ratio in the vicinity of the lean limit by taking a torque fluctuation value, which is different to SA-CA10, as an index. However, it can be said that the practicality of a technique that utilizes a torque fluctuation value that is based on statistical processing is low since the processing takes time and the technique is hard to be implemented during transient operation. In contrast, by adopting SA-CA10, lean limit control can be performed by a technique that does not depend on statistical processing.

Next, the reason why CA10 is preferable in comparison to other combustion points as a combustion point (predetermined crank angle at which the MFB becomes a predetermined mass fraction burned) that is used to specify a crank angle period as an index of an ignition delay that is a period between this combustion point and the spark timing will be described. Also in the case of utilizing a combustion point that is other than CA10 within an initial combustion period (CA0-CA10) prior to the start of main combustion, it is possible to utilize such combustion point for the feedback control of the present embodiment since the obtained crank angle period will be a period in which the influences of factors that affect ignition will be favorably represented. On the other hand, with regard to the combustion start point (CA0), an error is liable to arise due to the influence of noise that is superimposed on an output signal from the in-cylinder pressure sensor 30 that the ECU 40 acquires. The influence of this noise decreases as the combustion point moves away from the combustion start point (CA0). Therefore, in consideration of noise resistance, it can be said that CA10 is the optimal combustion point with respect to a crank angle period defined as a delay period between a combustion point and the spark timing (SA), as in the present embodiment.

As described above, it can be said that SA-CA10 is excellent as an index value when performing feedback control of the air-fuel ratio to control the air-fuel ratio in the vicinity of the lean limit to achieve low fuel efficiency. However, the feedback control of the air-fuel ratio using SA-CA10 itself is not limited to lean combustion, and is also applicable to stoichiometric air-fuel ratio combustion.

Figure 16:
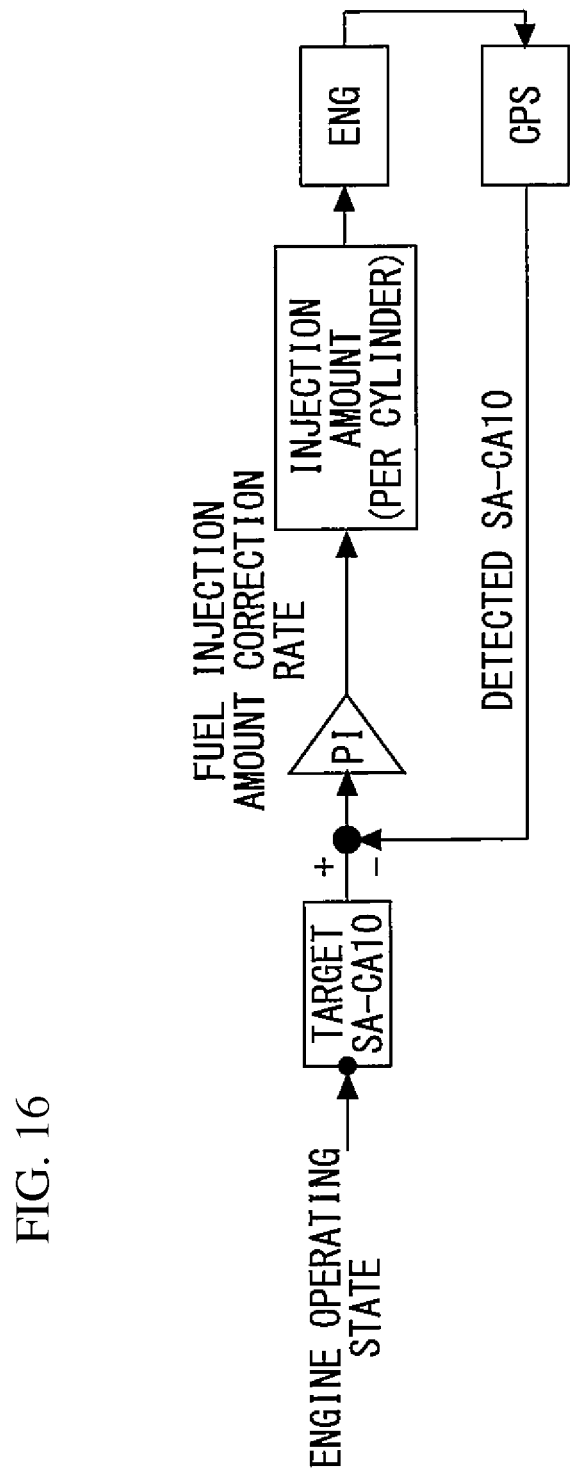
FIG. 16 is a block diagram for describing an overview of feedback control of a fuel injection amount utilizing SA-CA10.

FIG. 16 is a block diagram for describing an overview of feedback control of a fuel injection amount utilizing SA-CA10. According to this feedback control, as shown in FIG. 16, the target SA-CA10 is set in accordance with the engine operating state (specifically, the engine speed and the in-cylinder charged air amount). The detected SA-CA10 is calculated for each cycle in each cylinder.

According to this feedback control, as one example PI control is used for adjusting the fuel injection amount so as to eliminate a difference between the target SA-CA10 and the detected SA-CA10. According to the PI control, a difference between the target SA-CA10 and the detected SA-CA10 as well as a predetermined PI gain (proportional gain and integral gain) are used to calculate a fuel injection amount correction rate that is in accordance with this difference and the size of an integrated value thereof. Further, a fuel injection amount correction rate calculated for each cylinder is reflected in the fuel injection amount of the cylinder that is the object of the PI control. By this means, a fuel injection amount for each cylinder of the internal combustion engine (ENG) 10 is adjusted (corrected) by means of the aforementioned feedback control.

(Specific Processing in Third Embodiment)

First, a control routine that the ECU 40 executes to realize feedback control of the air-fuel ratio using the aforementioned SA-CA10 will be described referring to the flowchart in FIG. 17. Note that, it is assumed that the present routine is repeatedly executed for each cycle at a predetermined timing after the end of combustion in each cylinder when operating conditions that are an object of the present feedback control are established. Further, it is assumed that the present routine is executed concurrently with a routine that is illustrated in FIG. 18 that is described later.

Figure 17:
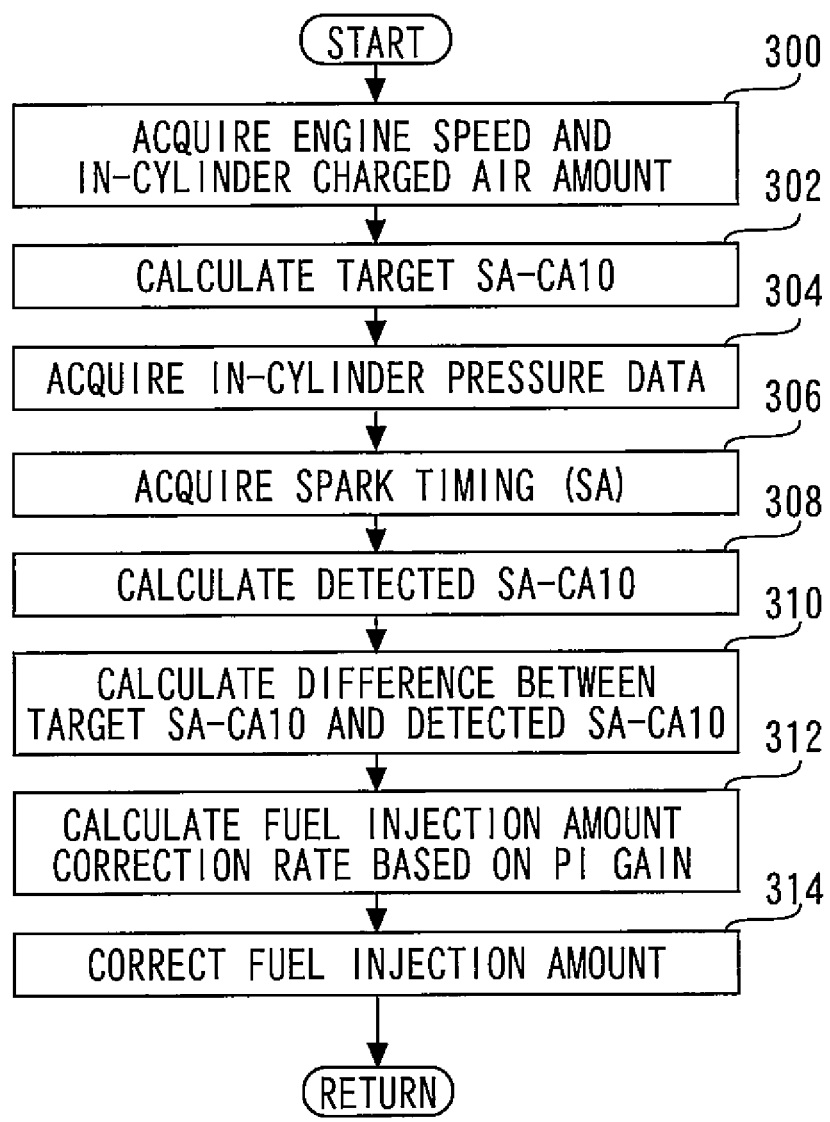
FIG. 17 is a flowchart illustrating a routine that is executed in a third embodiment of the present invention.
Figure 18:
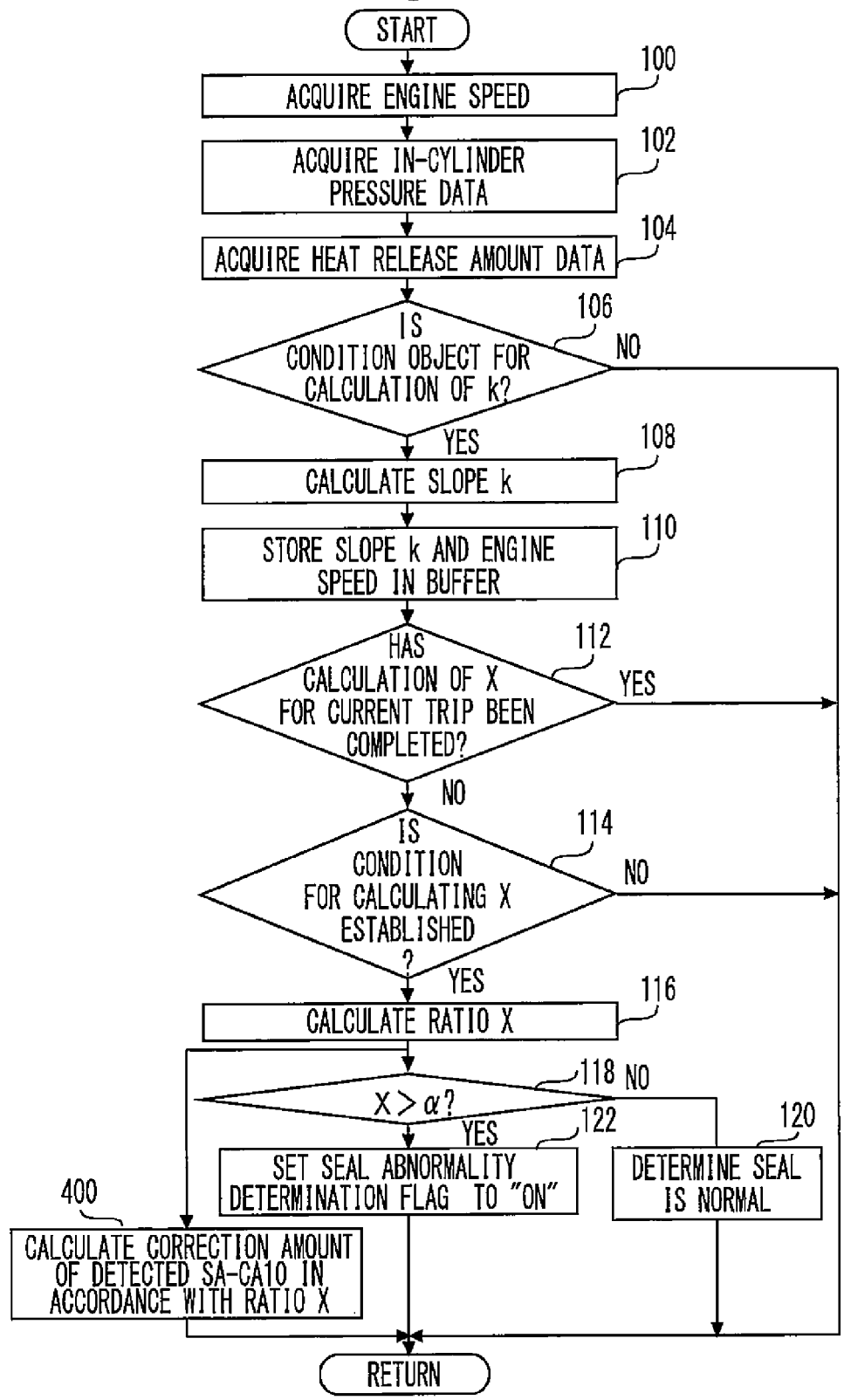
FIG. 18 is a flowchart illustrating a routine that is executed in the third embodiment of the present invention.

In the routine illustrated in FIG. 17, first, the ECU 40 acquires the engine speed and the in-cylinder charged air amount using the crank angle sensor 42 and the air flow meter 44 (step 300). Next, the ECU 40 calculates a target SA-CA10 (step 302). The ECU 40 stores a map (not shown in the drawings) in which values for the target SA-CA10 are predefined using the relation between the engine speed and the in-cylinder charged air amount based on results obtained by experimentation or the like. In the present step 302, the ECU 40 refers to the map to acquire a target SA-CA10 based on the engine speed and the in-cylinder charged air amount acquired in step 300.

Next, the ECU 40 acquires in-cylinder pressure data that was measured at a time of combustion utilizing the in-cylinder pressure sensor 30 and the crank angle sensor 42 (step 304). Subsequently, the ECU 40 acquires the spark timing (step 306). The ECU 40 stores a map (not shown in the drawings) that defines a target (required) spark timing (basically, an optimal spark timing) based on the relation between the in-cylinder charged air amount and the engine speed, and in the present step 306 the ECU 40 refers to the map to acquire the spark timing.

Next, the ECU 40 calculates a detected SA-CA10 (step 308). A base value of the detected SA-CA10 is calculated as a crank angle period from a spark timing (SA) acquired in step 306 to CA10 that is obtained as a result of analysis of the in-cylinder pressure data that was acquired in step 304. Additionally, if a correction amount for the detected SA-CA10 is calculated by the processing in step 400 in the routine illustrated in FIG. 18, this correction amount is added to the aforementioned base value.

Next, the ECU 40 calculates a difference between the target SA-CA10 and the detected SA-CA10 that were calculated in steps 302 and 308 (step 310). Subsequently, the ECU 40 uses the difference calculated in step 310 and a predetermined PI gain (proportional gain and integral gain) to calculate a fuel injection amount correction rate in accordance with the difference and the size of an integrated value thereof (step 312). Thereafter, the ECU 40 corrects a fuel injection amount for the next cycle based on the calculated fuel injection amount correction rate (step 314). Specifically, According to the relation illustrated in FIG. 15, for example, a case where the detected SA-CA10 is greater than the target SA-CA10 corresponds to a case where the air-fuel ratio deviates to the lean side relative to the intended value. Hence in such a case, a fuel injection amount is increased relative to the base value of the fuel injection amount in order to correct the air-fuel ratio to the rich side.

According to the routine illustrated in FIG. 17 that is described above, feedback control of the fuel injection amount is executed so as to eliminate a difference between the target SA-CA10 and the detected SA-CA10. As mentioned above, SA-CA10 has linearity with respect to the air-fuel ratio even in the vicinity of the lean limit. Consequently, by adjusting the fuel injection amount so as to eliminate a difference between the target SA-CA10 and the detected SA-CA10 by means of the technique of the present embodiment, the air-fuel ratio can be favorably controlled so that a desired target air-fuel ratio is obtained, including a case where the air-fuel ratio is controlled in the vicinity of the lean limit. If a configuration is adopted that, in contrast to the technique of the present embodiment, uses only CA10 to adjust the fuel injection amount so that the detected CA10 becomes a target value, the following problem arises. That is, if the spark timing changes, CA10 will change in accompaniment therewith. In contrast, SA-CA10 that is a crank angle period from the spark timing until CA10 hardly changes even if the spark timing changes. Consequently, by using SA-CA10 as an index for adjusting the fuel injection amount, in comparison to a case of using only CA10, the correlation with the air-fuel ratio can be favorably ascertained in a manner that eliminates the influence of the spark timing.

Next, a routine that the ECU 40 executes in order to determine an abnormality in the sealing function of the seal portion 34 and to calculate a correction amount of the detected SA-CA10 will be described referring to the flowchart in FIG. 18. Note that, in FIG. 18, steps that are the same as steps shown in FIG. 9 according to the first embodiment are denoted by the same reference numerals, and a description of those steps is omitted or simplified. Further, as described above, the feedback control of the air-fuel ratio using SA-CA10 is favorable as air-fuel ratio control at a time of lean combustion operation in particular. In the first embodiment, a time of stoichiometric air-fuel ratio combustion operation was exemplified as an operating condition that is an object for calculation of the slope k in step 106. However, even in a case where feedback control of the air-fuel ratio using SA-CA10 is performed at a time of lean combustion operation, calculation of the slope k can be accurately performed as long as, as described above, the calculation is performed under circumstances in which the air-fuel ratio is not made lean to the extent that combustion becomes extremely slow.

In the routine illustrated in FIG. 18, after the ratio X is calculated in step 116, the ECU 40 concurrently executes abnormality determination processing based on the ratio X (steps 118 to 122) and processing to calculate a correction amount of the detected SA-CA10 based on the ratio X (step 400). In step 400, as described above referring to FIG. 14, the ECU 40 calculates the correction amount of the detected SA-CA10 as a value that increases as the ratio X increases.

The detected SA-CA10 is corrected in accordance with the ratio X as a result of the routine illustrated in FIG. 18 being executed together with the routine illustrated in FIG. 17. By this means, it is possible to suppress the occurrence of a decline in the accuracy of feedback control of the air-fuel ratio that uses the SA-CA10, due to a decline in the sealing performance of the seal portion 34. Further, according to the above described routine, correction of the detected SA-CA10 is performed in parallel with determination of an abnormality in the sealing function. By this means, during fail-safe driving after the occurrence of an abnormality in the sealing function is detected and the malfunction indicator lamp 46 lights, a decrease in the accuracy of feedback control of the air-fuel ratio using SA-CA10 (that is, a deterioration in the fuel efficiency and in the drivability of the internal combustion engine 10) is suppressed as much as possible.

In the above described third embodiment, an example has been described in which correction of a detected value of the ignition delay period (SA-CA10) is performed in accordance with the ratio X. However, a configuration may also be adopted in which correction of a detected value of an ignition delay period that is specified using SA-CA10 or the like is performed in combination with the abnormality determination processing described in the second embodiment. That is, for example, the relation between the slope k that is acquired in a specific engine speed segment and an ignition delay period may be ascertained in advance, and a correction amount of the ignition delay period may be calculated in accordance with the slope k that is acquired in the engine speed segment in which this relation was ascertained.

Fourth Embodiment

Next, a fourth embodiment of the present invention will be described referring mainly to FIG. 19 to FIG. 22. The system of the present embodiment can be realized by using the hardware configuration illustrated in FIG. 1, and causing the ECU 40 to execute the routines shown in FIG. 21 and FIG. 22, described later, instead of the routine shown in FIG. 9.

[Feature Portion of Fourth Embodiment]

As shown in the above described FIG. 12B, when an abnormality has arisen in the sealing function, not only the 10% combustion point CA10 but also a 50% combustion point CA50 that corresponds to the combustion center is shifted to the advancement side in comparison to a time when the seal is normal. As will be understood from FIG. 12B, the amount of such a shift is greater for CA50 than for CA10.

(Correction of Combustion Center (CA50) Based on Ratio X)

When any kind of engine control, determination processing, or estimation processing is performed utilizing the combustion center (CA50), if an error with respect to the actual value arises in a detected value of CA50 due to an increase in the ratio X, the engine control or the like will be affected by the error and the accuracy of the control or the like will be unfavorable.

Figure 19:
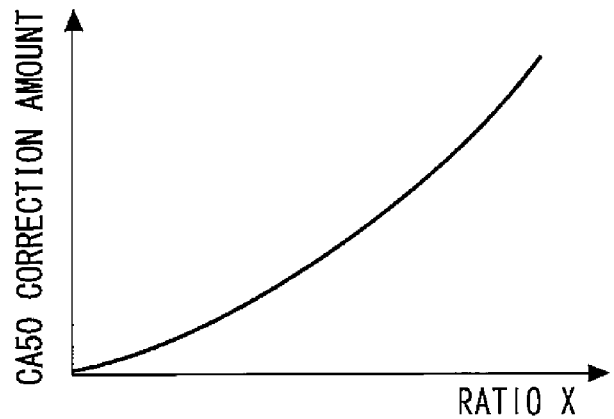
FIG. 19 is a view for describing the manner of setting a correction amount for CA50 based on a ratio X.

FIG. 19 is a view for describing the manner of setting a correction amount of CA50 based on the ratio X. An error between a detected value and an actual value of CA50 increases as the ratio X. In correspondence with this fact, as shown in FIG. 19, the correction amount of CA50 is set so as to increase as the ratio X increases.

(Feedback Control of Spark Timing Using CA50)

The system of the present embodiment performs feedback control of the spark timing for which CA50 was utilized, as one of the aforementioned kinds of engine control and the like that utilizes a combustion center (CA50) that is based on detected values of the in-cylinder pressure sensor 30. Specifically, the present feedback control is control that adjusts the spark timing so that a difference between a predetermined target CA50 and a detected CA50 becomes zero. The term "detected CA50" used here refers to a value for CA50 that is calculated based on a detected value of the in-cylinder pressure sensor 30.

Figure 20:
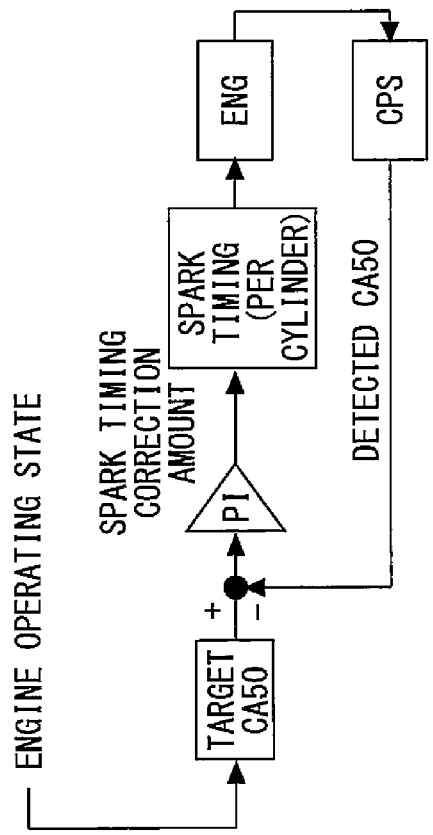
FIG. 20 is a block diagram for describing an overview of feedback control of a spark timing using CA50 in a fourth embodiment of the present invention.

FIG. 20 is a block diagram for describing an overview of feedback control of the spark timing using CA50 according to the fourth embodiment of the present invention. In order to correct the spark timing so as to eliminate a difference between the target CA50 and the detected CA50, as one example, PI control is also used for feedback control that utilizes the aforementioned CA50. According to the PI control, a difference between the target CA50 and the detected CA50 as well as a predetermined PI gain (proportional gain and integral gain) are used to calculate a spark timing correction amount that is in accordance with this difference and the size of an integrated value of the difference. Further, a spark timing correction amount calculated for the each cylinder is reflected in the spark timing of the cylinder that is the object of the PI control. By this means, the spark timing for each cylinder of the internal combustion engine (ENG) 10 is adjusted (corrected) by means of the aforementioned feedback control.

(Specific Processing in Fourth Embodiment)

Figure 21:
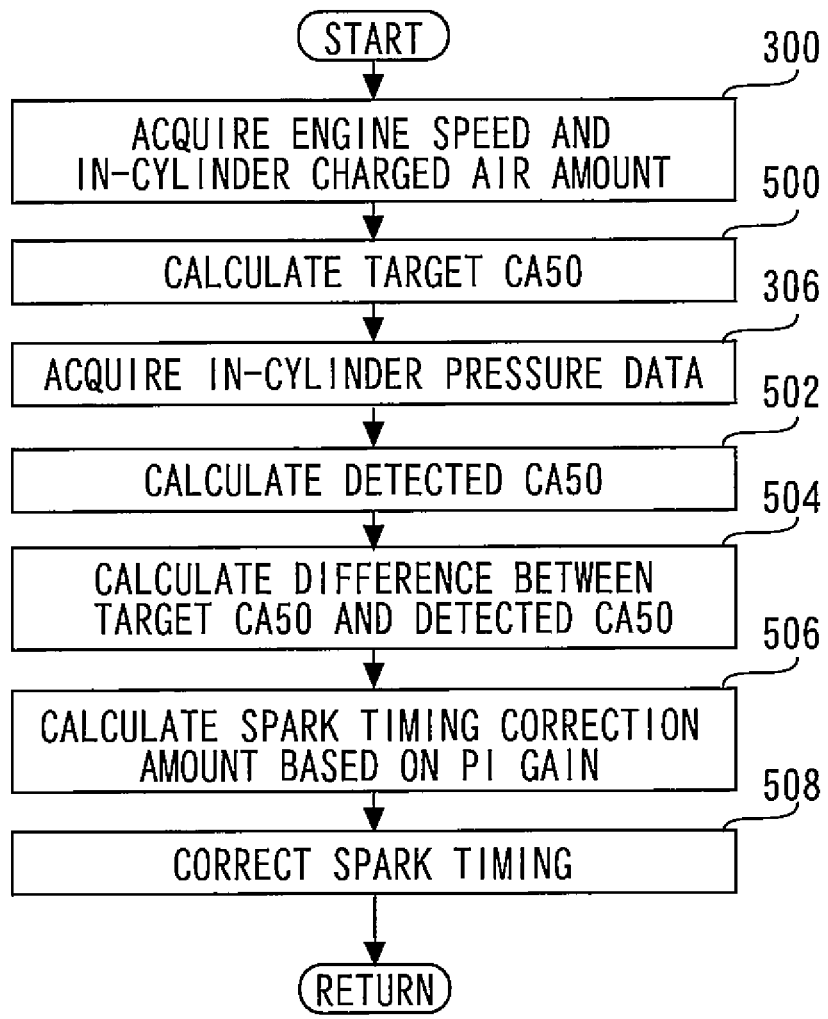
FIG. 21 is a flowchart illustrating a routine that is executed in the fourth embodiment of the present invention.

First, a control routine that the ECU 40 executes to realize feedback control of the spark timing using the aforementioned CA50 will be described referring to the flowchart in FIG. 21. In FIG. 21, steps that are the same as steps shown in FIG. 17 according to the third embodiment are denoted by the same reference numerals, and a description of those steps is omitted or simplified. Further, it is assumed that the present routine is executed concurrently with a routine that is illustrated in FIG. 22 that is described later.

According to the routine illustrated in FIG. 21, after acquiring the engine speed and the in-cylinder charged air amount in step 300, the ECU 40 proceeds to step 500. In step 500 the ECU 40 calculates the target CA50. The target CA50 is set based on the engine speed and the in-cylinder charged air amount acquired in step 300.

Subsequently, after acquiring in-cylinder pressure data in step 306, the ECU 40 proceeds to step 502. In step 502, the ECU 40 calculates the detected CA50 utilizing the result of analyzing the acquired in-cylinder pressure data. Subsequently, the ECU 40 calculates the difference between the target CA50 and the detected CA50 that were calculated in steps 500 and 502 (step 504).

Next, the ECU 40 uses the difference calculated in step 504 and a predetermined PI gain (proportional gain and integral gain) to calculate a spark timing correction amount in accordance with the difference and the size of an integrated value thereof (step 506). Thereafter, the ECU 40 corrects a spark timing for the next cycle based on the calculated spark timing correction amount (step 508). Specifically, there is a substantially one-to-one relation between CA50 and the spark timing. For example, in a case where the target CA50 is greater than the detected CA50 (that is, a case where the detected CA50 is retarded relative to the target CA50), the spark timing is advanced so as to start combustion earlier.

According to the routine illustrated in FIG. 21 that is described above, feedback control of the spark timing is executed using CA50. Thus, by adjusting the spark timing, the combustion center (CA50) can be controlled so as to be a position at which appropriate combustion is obtained.

Next, a routine that the ECU 40 executes in order to determine an abnormality in the sealing function of the seal portion 34 and to calculate a correction amount of the detected CA50 will be described referring to the flowchart in FIG. 22. Note that, in FIG. 22, steps that are the same as steps shown in FIG. 9 according to the first embodiment are denoted by the same reference numerals, and a description of those steps is omitted or simplified.

In the routine illustrated in FIG. 22, after the ratio X is calculated in step 116, the ECU 40 concurrently executes abnormality determination processing based on the ratio X (steps 118 to 122) and processing to calculate a correction amount of the detected CA50 based on the ratio X (step 600). In step 600, as described above referring to FIG. 19, the ECU 40 calculates the correction amount of the detected CA50 as a value that increases as the ratio X increases.

The detected CA50 is corrected in accordance with the ratio X as a result of the routine illustrated in FIG. 22 being executed together with the routine illustrated in FIG. 21. By this means, it is possible to suppress the occurrence of a decline in the accuracy of feedback control of the spark timing that uses the CA50, due to a decline in the sealing performance of the seal portion 34. Further, according to the above described routine, correction of the detected CA50 is performed in parallel with determination of an abnormality in the sealing function. By this means, during fail-safe driving after the occurrence of an abnormality in the sealing function is detected and the malfunction indicator lamp 46 lights, a decrease in the accuracy of feedback control of the spark timing using CA50 (that is, a deterioration in the fuel efficiency and in the drivability of the internal combustion engine 10) is suppressed as much as possible.

In the above described fourth embodiment, an example has been described in which correction of the detected CA50 is performed in accordance with the ratio X. However, a configuration may also be adopted in which correction of the detected CA50 is performed in combination with the abnormality determination processing described in the second embodiment. That is, for example, the relation between the slope k that is acquired in a specific engine speed segment and the detected CA50 may be ascertained in advance, and a correction amount of the detected CA50 may be calculated in accordance with the slope k that is acquired in the engine speed segment in which this relation was ascertained. Furthermore, correction of the detected CA50 in accordance with the ratio X or the slope k may be performed in combination with correction of a detected value for the ignition delay period (SA-CA10) in accordance with the ratio X or the slope k in the above described third embodiment.

In the above described first to fourth embodiments a configuration is adopted which utilizes the heat release amount Q that is calculated in accordance with equation (2) in order to calculate the slope k. However, in the present invention, a configuration may also be adopted in which a parameter $PV^{\kappa}$ that has a correlation with the heat release amount Q is used instead of the heat release amount Q in the processing to determine an abnormality in the sealing function of the seal portion.

Further, in the above described first to fourth embodiments, taking the spark ignition internal combustion engine 10 as an example, abnormality determination with respect to the sealing function of the seal portion as well as engine control that utilizes a parameter (ratio X or slope k) that is used for the abnormality determination are described. However, the abnormality determination with respect to the sealing function of the seal portion is not limited to a spark ignition internal combustion engine, and may also be applied to a compression ignition internal combustion engine.

The invention claimed is:

1. An internal combustion engine system, comprising:
an in-cylinder pressure sensor that includes: a housing that is formed into a cylindrical shape; a pressure receiving member that is provided at one end of the housing and configured to receive an in-cylinder pressure, the in-cylinder pressure being a pressure of a gas inside a combustion chamber; and a pressure detecting element that is arranged inside the housing and into which a compressive load that is based on the in-cylinder pressure configured to be input from the pressure receiving member, the pressure detecting element being configured to emit an output in accordance with the input compressive load;
a crank angle sensor configured to detect a crank angle;
a seal portion configured to, at a position that is further on the combustion chamber side than the pressure detecting element in an axial direction of the housing, seal a space between an outer face of the housing and a wall surface of the combustion chamber that surrounds the housing; and
a controller, the controller programmed to:
calculate a heat release amount in a cylinder that is an amount of heat released by combustion, based on in-cylinder pressure data that is data regarding an in-cylinder pressure that is detected by the in-cylinder pressure sensor;
calculate a first ratio that is a ratio of an amount of decrease in a heat release amount relative to an amount of increase in a crank angle in a period during an expansion stroke from an crank angle at which a calculated heat release amount exhibits a maximum value until an opening timing of an exhaust valve; and
determine existence or nonexistence of an abnormality in a sealing function of the seal portion based on the first ratio and an engine speed,
wherein, when a second ratio that is a ratio of an amount of decrease in the first ratio relative to an amount of increase in an engine speed is greater than a first threshold value, the controller determines that the sealing function of the seal portion is abnormal,
wherein the controller calculates a mass fraction burned and calculates an ignition delay period using a spark timing and a calculated mass fraction burned,
wherein the controller corrects a calculated ignition delay period in accordance with a size of the second ratio, and
wherein the controller adjusts at least one of a fuel injection amount, an intake air amount and an ignition energy to eliminate a difference between a calculated ignition delay period and a target value of the ignition delay period.

2. The internal combustion engine system according to claim 1, wherein the controller makes a determination with respect to an abnormality in the sealing function of the seal portion at a time that an internal combustion engine is operating under a stoichiometric air-fuel ratio.

3. An internal combustion engine system, comprising:
an in-cylinder pressure sensor that includes: a housing that is formed into a cylindrical shape; a pressure receiving member that is provided at one end of the housing and configured to receive an in-cylinder pressure, the in-cylinder pressure being a pressure of a gas inside a combustion chamber; and a pressure detecting element that is arranged inside the housing and into which a compressive load that is based on the in-cylinder pressure configured to be input from the pressure receiving member, the pressure detecting element being configured to emit an output in accordance with the input compressive load;
a crank angle sensor configured to detect a crank angle;
a seal portion configured to, at a position that is further on the combustion chamber side than the pressure detecting element in an axial direction of the housing, seal a space between an outer face of the housing and a wall surface of the combustion chamber that surrounds the housing; and
a controller, the controller programmed to:
calculate a heat release amount in a cylinder that is an amount of heat released by combustion, based on in-cylinder pressure data that is data regarding an in-cylinder pressure that is detected by the in-cylinder pressure sensor;
calculate a first ratio that is a ratio of an amount of decrease in a heat release amount relative to an amount of increase in a crank angle in a period during an expansion stroke from an crank angle at which a calculated heat release amount exhibits a maximum value until an opening timing of an exhaust valve; and
determine existence or nonexistence of an abnormality in a sealing function of the seal portion based on the first ratio and an engine speed,
wherein, when a second ratio that is a ratio of an amount of decrease in the first ratio relative to an amount of increase in an engine speed is greater than a first threshold value, the controller determines that the sealing function of the seal portion is abnormal,
wherein the controller calculates a mass fraction burned and calculates a combustion center based on a calculated mass fraction burned,
wherein the controller corrects a calculated combustion center in accordance with a size of the second ratio, and
wherein the controller adjusts a spark timing to eliminate a difference between a calculated combustion center and a target combustion center.

4. An internal combustion engine system, comprising:
an in-cylinder pressure sensor that includes: a housing that is formed into a cylindrical shape; a pressure receiving member that is provided at one end of the housing and configured to receive an in-cylinder pressure, the in-cylinder pressure being a pressure of a gas inside a combustion chamber; and a pressure detecting element that is arranged inside the housing and into which a compressive load that is based on the in-cylinder pressure configured to be input from the pressure receiving member, the pressure detecting element being configured to emit an output in accordance with the input compressive load;
a crank angle sensor configured to detect a crank angle;
a seal portion configured to, at a position that is further on the combustion chamber side than the pressure detecting element in an axial direction of the housing, seal a space between an outer face of the housing and a wall surface of the combustion chamber that surrounds the housing; and a controller, the controller programmed to:

calculate a heat release amount in a cylinder that is an amount of heat released by combustion, based on in-cylinder pressure data that is data regarding an in-cylinder pressure that is detected by the in-cylinder pressure sensor;

calculate a first ratio that is a ratio of an amount of decrease in a heat release amount relative to an amount of increase in a crank angle in a period during an expansion stroke from an crank angle at which a calculated heat release amount exhibits a maximum value until an opening timing of an exhaust valve; and determine existence or nonexistence of an abnormality in a sealing function of the seal portion based on the first ratio and an engine speed, wherein when the first ratio is greater than a second threshold value that corresponds to an engine speed in a cycle in which in-cylinder pressure data that serves as a basis for calculation of the first ratio is acquired, the controller determines that the sealing function of the seal portion is abnormal, wherein the second threshold value is set so as to become smaller when the engine speed is high in comparison to when the engine speed is low, wherein the controller calculates a mass fraction burned and calculates an ignition delay period using a spark timing and a calculated mass fraction burned, wherein the controller corrects a calculated ignition delay period in accordance with a size of the first ratio, and wherein the controller adjusts at least one of a fuel injection amount, an intake air amount and an ignition energy to eliminate a difference between a calculated ignition delay period and a target value of the ignition delay period.

5. An internal combustion engine system, comprising:

an in-cylinder pressure sensor that includes: a housing that is formed into a cylindrical shape; a pressure receiving member that is provided at one end of the housing and configured to receive an in-cylinder pressure, the in-cylinder pressure being a pressure of a gas inside a combustion chamber; and a pressure detecting element that is arranged inside the housing and into which a compressive load that is based on the in-cylinder pressure configured to be input from the pressure receiving member, the pressure detecting element being configured to emit an output in accordance with the input compressive load;

a crank angle sensor configured to detect a crank angle;

a seal portion configured to, at a position that is further on the combustion chamber side than the pressure detecting element in an axial direction of the housing, seal a space between an outer face of the housing and a wall surface of the combustion chamber that surrounds the housing; and a controller, the controller programmed to:

calculate a heat release amount in a cylinder that is an amount of heat released by combustion, based on in-cylinder pressure data that is data regarding an in-cylinder pressure that is detected by the in-cylinder pressure sensor;

calculate a first ratio that is a ratio of an amount of decrease in a heat release amount relative to an amount of increase in a crank angle in a period during an expansion stroke from an crank angle at which a calculated heat release amount exhibits a maximum value until an opening timing of an exhaust valve; and determine existence or nonexistence of an abnormality in a sealing function of the seal portion based on the first ratio and an engine speed, wherein when the first ratio is greater than a second threshold value that corresponds to an engine speed in a cycle in which in-cylinder pressure data that serves as a basis for calculation of the first ratio is acquired, the controller determines that the sealing function of the seal portion is abnormal, wherein the second threshold value is set so as to become smaller when the engine speed is high in comparison to when the engine speed is low, wherein the controller calculates a mass fraction burned and calculates a combustion center based on a calculated mass fraction burned, wherein the controller corrects a calculated combustion center in accordance with a size of the first ratio, and wherein the controller adjusts a spark timing to eliminate a difference between a calculated combustion center and a target combustion center.

* * * * *